US010619326B2

(12) United States Patent
Hita et al.

(10) Patent No.: US 10,619,326 B2
(45) Date of Patent: Apr. 14, 2020

(54) CONSTRUCTION WORK MACHINE WITH CORRECTIVE POWER CONTROL

(71) Applicant: HITACHI CONSTRUCTION MACHINERY CO., LTD., Tokyo (JP)

(72) Inventors: Masafumi Hita, Tsuchiura (JP); Kouichi Shibata, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 210 days.

(21) Appl. No.: 15/821,900

(22) Filed: Nov. 24, 2017

(65) Prior Publication Data

US 2018/0282969 A1    Oct. 4, 2018

(30) Foreign Application Priority Data

Mar. 31, 2017    (JP) ................. 2017-069582

(51) Int. Cl.
*E02F 3/43*    (2006.01)
*G05B 19/416*    (2006.01)
*E02F 9/26*    (2006.01)
*E02F 3/32*    (2006.01)
*E02F 3/42*    (2006.01)
*E02F 9/22*    (2006.01)
*F15B 19/00*    (2006.01)

(52) U.S. Cl.
CPC ............... *E02F 3/439* (2013.01); *E02F 3/32* (2013.01); *E02F 3/425* (2013.01); *E02F 3/437* (2013.01); *E02F 9/2203* (2013.01); *E02F 9/2271* (2013.01); *E02F 9/262* (2013.01); *E02F 9/265* (2013.01); *F15B 19/002* (2013.01); *G05B 19/416* (2013.01); *E02F 9/2292* (2013.01)

(58) Field of Classification Search
CPC ... E02F 3/439; E02F 3/32; E02F 3/425; E02F 3/437; E02F 9/2203; E02F 9/2271; E02F 9/262; E02F 9/265; E02F 9/2292; F15B 19/002; G05B 19/416

USPC .......................................................... 701/50
See application file for complete search history.

(56) References Cited

U.S. PATENT DOCUMENTS 9,725,878 B2 *    8/2017    Amano .................. E02F 9/123
2014/0371995 A1 *    12/2014    Udagawa ................ E02F 9/123
                                                            701/50
2015/0300378 A1 *    10/2015    Udagawa .................. E02F 3/32
                                                            60/449

FOREIGN PATENT DOCUMENTS

JP          5864775 B2       2/2016
WO       2015/025986 A1     2/2015

* cited by examiner

*Primary Examiner* — Paula L Schneider
(74) *Attorney, Agent, or Firm* — Mattingly & Malur, PC

(57) ABSTRACT

The invention provides a work machine that achieves high accuracy of forming a target construction surface and reduced fuel consumption. A trajectory corrective Pi pressure calculation section calculates a trajectory corrective pressure, which is a control signal for a boom cylinder, based on the distance from a front work device to a target construction surface such that the motion trajectory of the work device is maintained above the target construction surface. A power corrective Pi pressure calculation section calculates a power corrective pressure, which is a control signal for the boom cylinder, based on the bottom pressure of an arm cylinder when the difference between the target power and actual power of the arm cylinder is larger than a predetermined output power value. The boom cylinder is controlled based on the larger of the power corrective pressure and the trajectory corrective pressure while the arm cylinder is being operated.

5 Claims, 17 Drawing Sheets

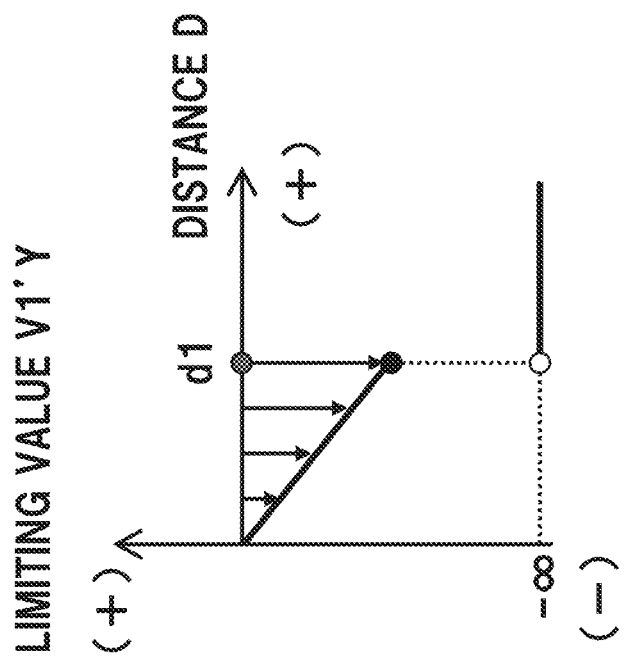

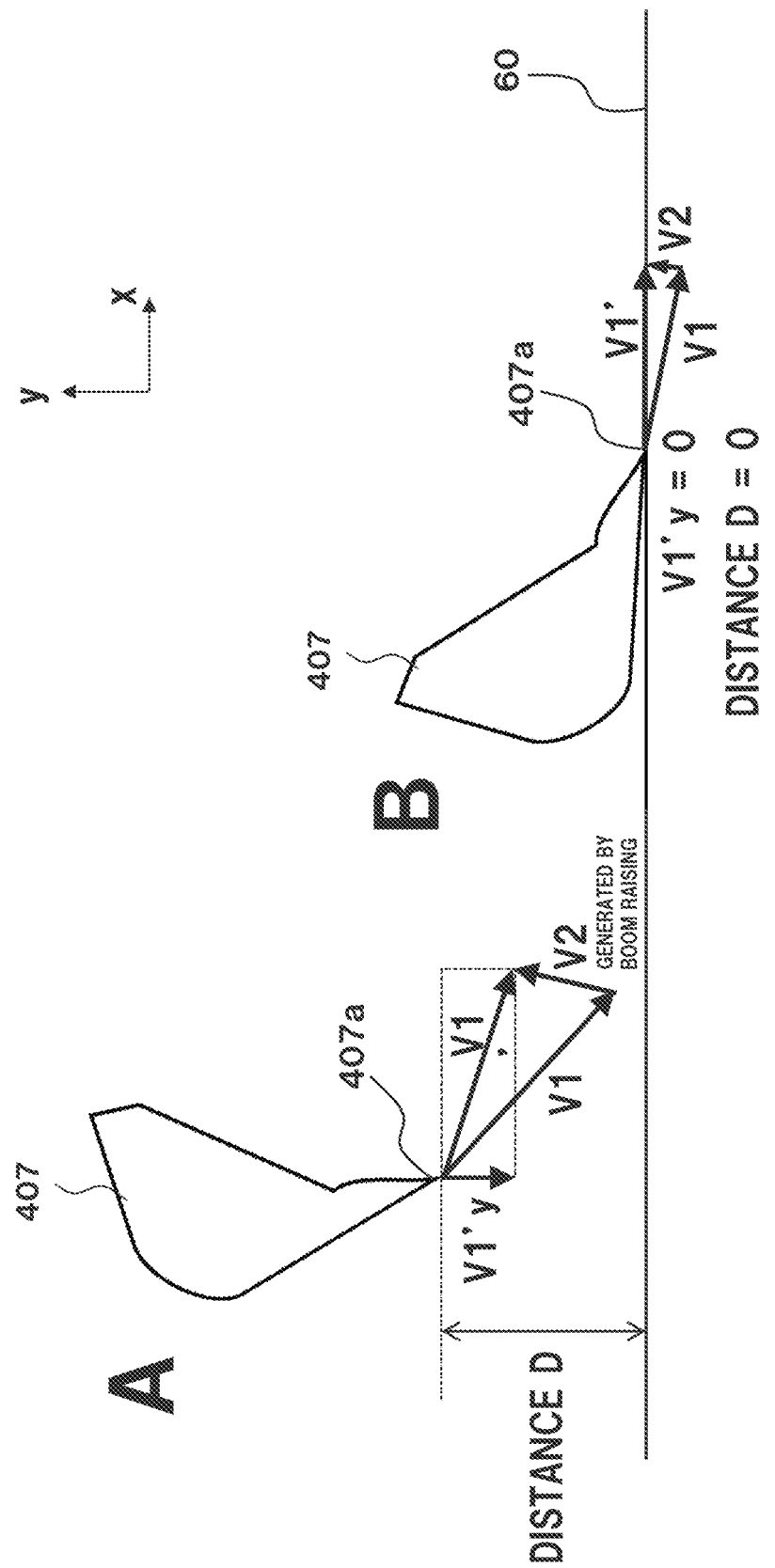

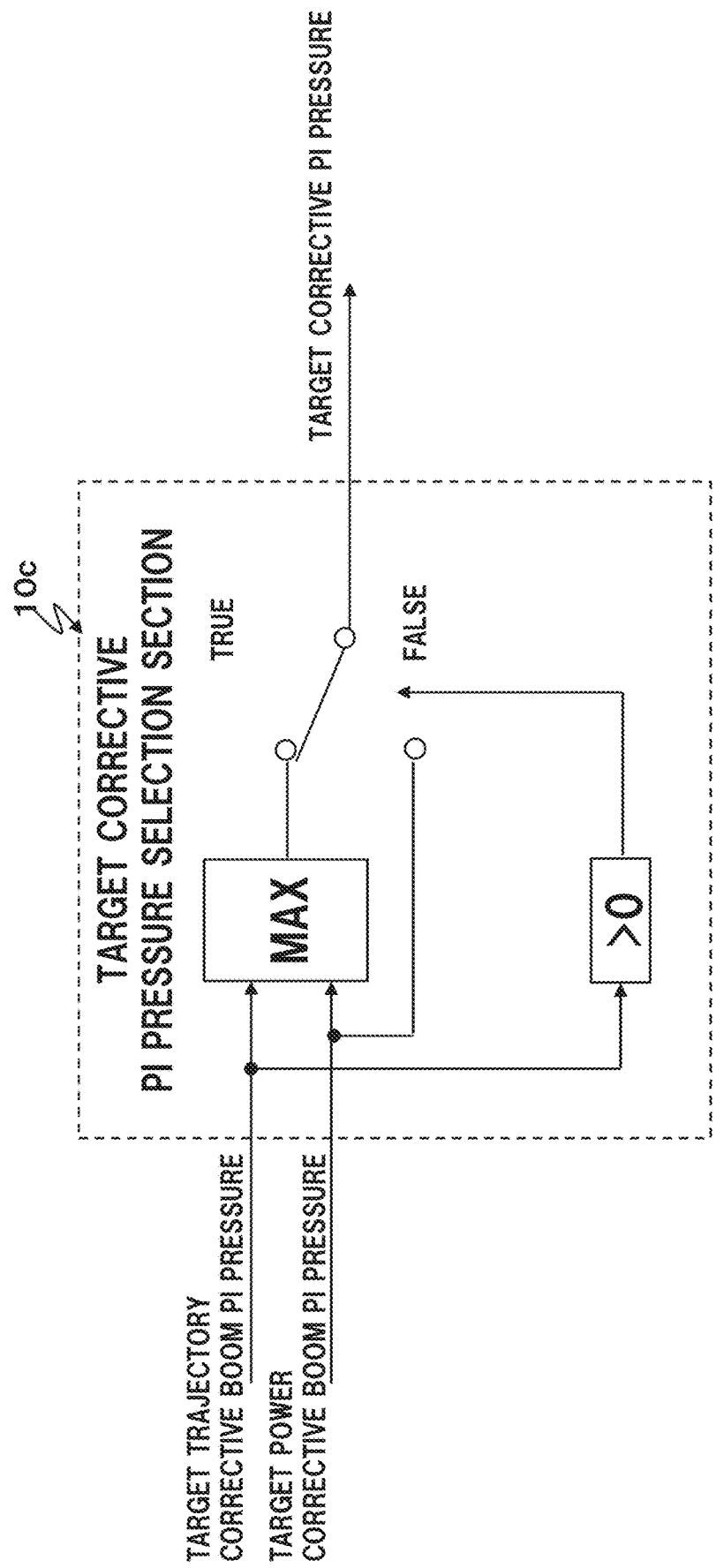

CONSTRUCTION WORK MACHINE WITH CORRECTIVE POWER CONTROL

BACKGROUND OF THE INVENTION

1. Field of the Invention

The present invention relates to work machines.

2. Description of the Related Art

In the field of work machines including hydraulic excavators, recent years have seen the active development of information-aided construction machines. For the purpose of improving construction accuracy and efficiency, such a machine stores information on target construction surfaces and semi-automatically controls the operation of its work device such that a target construction surface to be formed will not be destroyed by the work device.

In the hydraulic excavator of Japanese Patent No. 5864775, when the bucket teeth tips reach a target construction surface through the operation of the arm, the bucket teeth tips are controlled to move along the target construction surface by automatic boom raising. The velocity of the automatic boom raising is calculated by taking into consideration the operational amount of the arm as well as the distance from the target construction surface to the bucket teeth tips. By doing so, the boom's hunting, or unwanted vertical movement, is prevented, thereby improving the accuracy of forming the target construction surface.

SUMMARY OF THE INVENTION

In the hydraulic excavator of Japanese Patent No. 5864775, while the accuracy of forming the target construction surface is improved, there is still room for improvement in terms of fuel efficiency.

For example, when hard ground is to be excavated along a target construction surface, the load on the bucket teeth tips may become too large during the excavation, which may stop the operation of the front work device. Also, the arm and the bucket may not be able to perform their work, resulting in fuel being wasted. Conversely, if the target construction surface is formed by repeating slight excavations of the ground to avoid such circumstances, the number of excavations to be performed will be increased, which may in turn increase fuel consumption.

The present invention has been contrived in view of the above, and an object of the invention is to provide a work machine that achieves high accuracy of forming a target construction surface and reduced fuel consumption at the same time.

The invention includes several means for solving the above problems, one of which is a work machine comprising: a multi-joint work device for forming a target construction surface; a plurality of hydraulic actuators for driving the work device based on control signals: and a controller including a trajectory corrective control signal calculation section for calculating based on the distance from the work device to the target construction surface a trajectory corrective control signal that is a control signal for at least one correction target hydraulic actuator among the plurality of hydraulic actuators such that the motion trajectory of the work device is maintained above the target construction surface, characterized in that the controller further includes a power corrective control signal calculation section for calculating, when the difference between the target power and actual power of at least one particular hydraulic actuator among the plurality of hydraulic actuators is larger than a predetermined output power value, a power corrective control signal that is a control signal for the correction target hydraulic actuator based on the drive pressure of the particular hydraulic actuator, and that the correction target hydraulic actuator is controlled based on the larger of the power corrective control signal and the trajectory corrective control signal while the particular hydraulic actuator is being operated.

In accordance with the invention, it is possible to achieve high accuracy of forming a target construction surface and reduced fuel consumption at the same time.

BRIEF DESCRIPTION OF THE DRAWINGS

FIG. 4 is a detailed diagram of a target actuator power calculation section 3a;

FIG. 5 is a detailed diagram of a maximum output power calculation section 4a;

FIG. 11 is a detailed diagram of a power corrective Pi pressure calculation section 10a;

FIG. 15 is a graph illustrating the relation between a limiting value ay for the vertical component of bucket teeth tips velocity and a distance D;

FIG. 16 is a diagram illustrating how to correct the trajectory of bucket teeth tips; and FIG. 17 is a detailed diagram of a target corrective Pi pressure selection section 10c.

DESCRIPTION OF THE PREFERRED EMBODIMENTS

An embodiment of the present invention will now be described with reference to the accompanying drawings.

<1. Hardware Structure of the Hydraulic Excavator>

Figure 1:
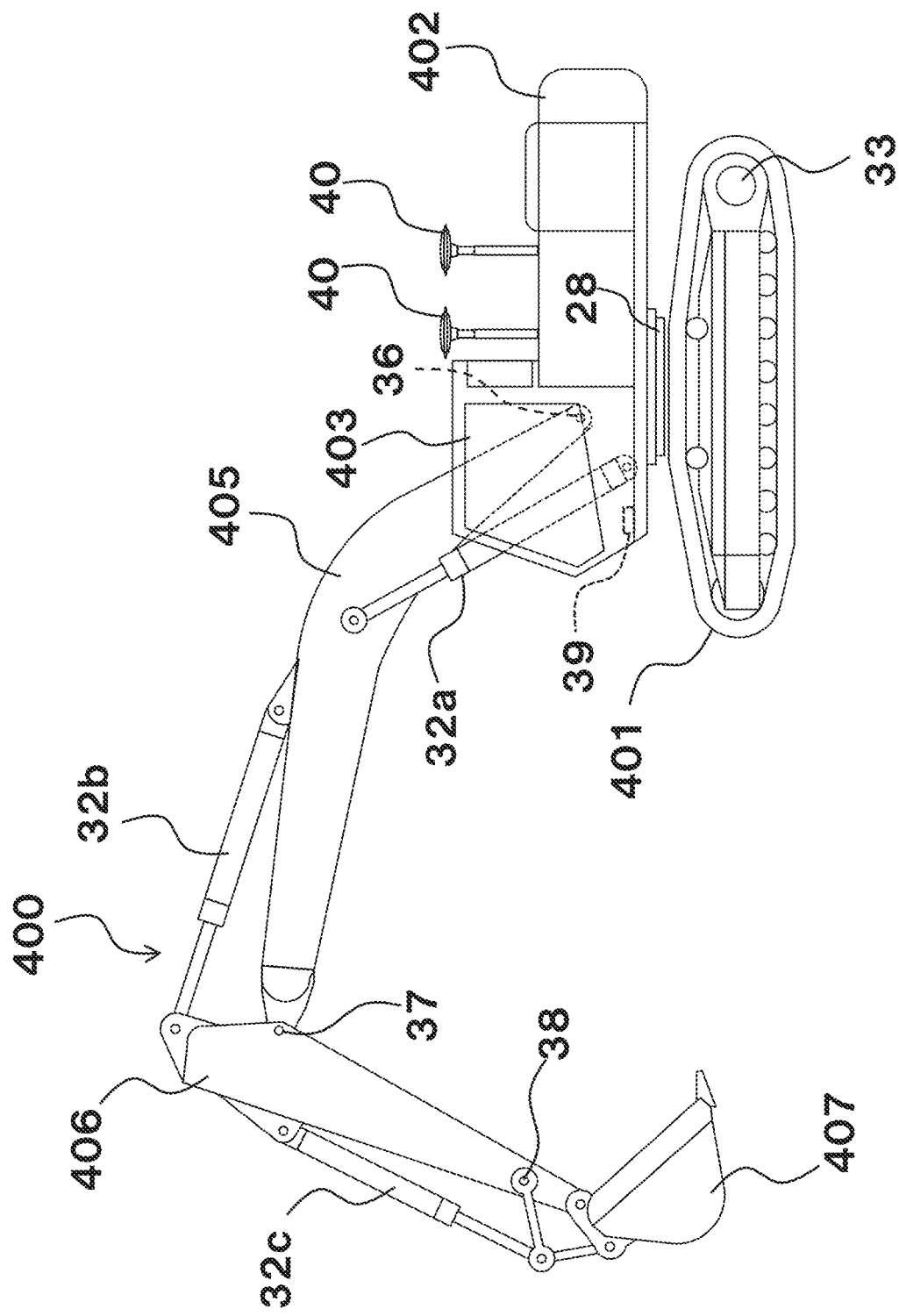
FIG. 1 is a schematic of a hydraulic excavator according to an embodiment of the invention.

FIG. 1 is a schematic of a hydraulic excavator according to an embodiment of the invention. As illustrated in FIG. 1, the hydraulic excavator includes a crawler-type travel structure 401 and a swing structure 402 attached swingably atop the travel structure 401. The travel structure 401 is driven by a hydraulic travel motor 33. The swing structure 402 is driven by the torque generated by a hydraulic swing motor 28 and swung laterally.

A cab 403 is provided on the swing structure 402, and a multi-joint front work device 400 is attached to the front of the swing structure 402. The front work device 400 is used to form a target construction surface.

The front work device 400 includes a boom 405 driven by a boom cylinder 33a; an arm 406 driven by an arm cylinder 33b; and a bucket 407 driven by a bucket cylinder 33c.

Provided inside the cab 403 are an operating lever 26 that generates control signals for the boom cylinder 33a, arm cylinder 33b, bucket cylinder 33c, hydraulic travel motor 33, and hydraulic swing motor 28 (pilot pressures (hereinafter referred to also as Pi pressures) output from a gear pump 24 (see FIG. 2)) based on operating directions and amounts and uses those signals to operate the boom 405, arm 406, bucket 407, swing structure 402, and travel structure 401 and an engine control dial 51 (see FIG. 2) for specifying a target speed for an engine 21 (see FIG. 2).

Figure 2:
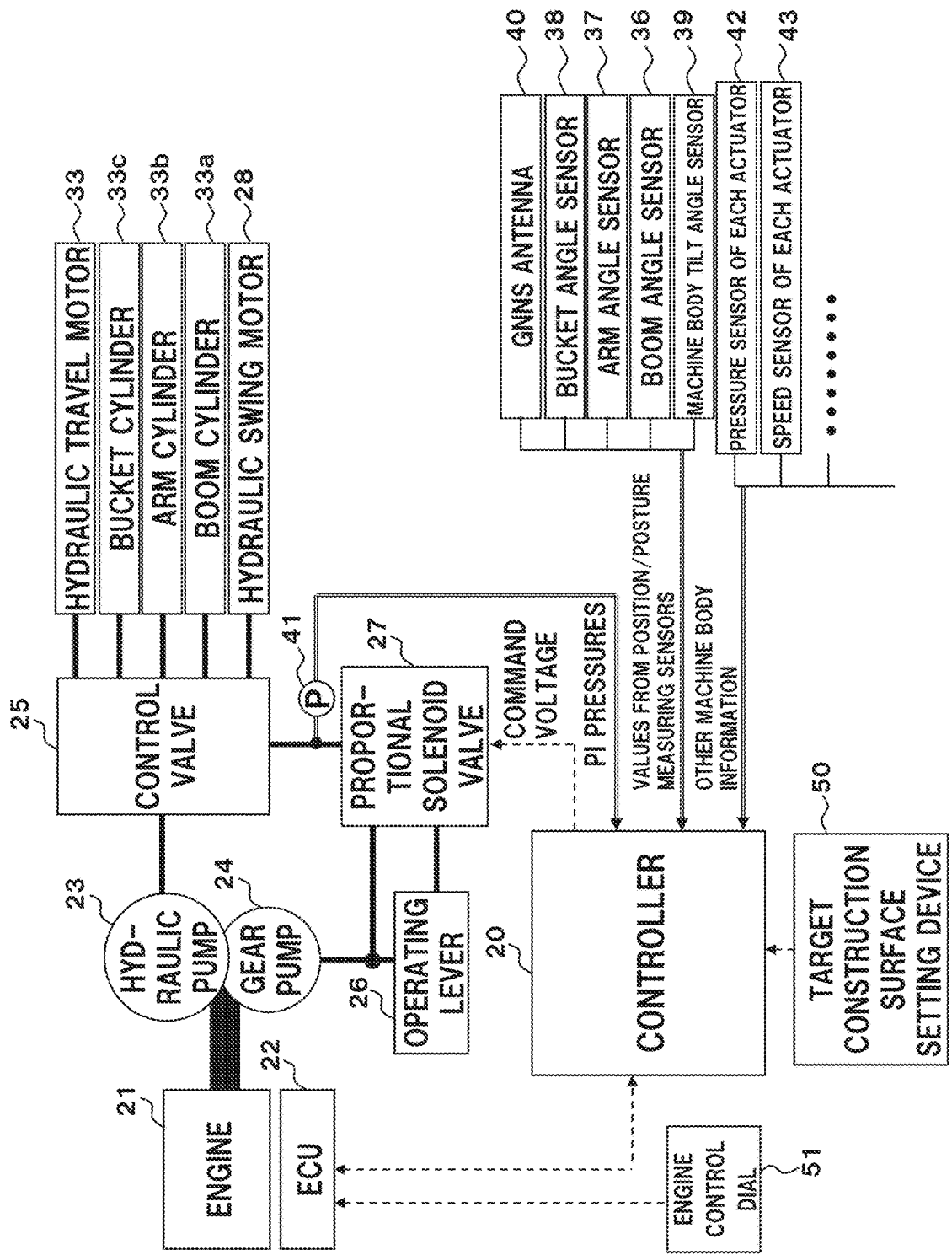
FIG. 2 is a diagram illustrating the system configuration of the hydraulic excavator of FIG. 1.

FIG. 2 is a diagram illustrating the system configuration of the hydraulic excavator of FIG. 1. The hydraulic excavator of the present embodiment includes the engine 21; an engine control unit (ECU) 22 or a computer that controls the engine 21; a hydraulic pump 23 and the gear pump (pilot pump) 24, both coupled mechanically with the output shaft of the engine 21 and driven by the engine 21; the operating lever 26 that reduces the pressure of the hydraulic fluid delivered from the gear pump 24 based on operation amounts and outputs the pressure-reduced fluid through proportional solenoid valves 27 to control valves 25 as control signals for the hydraulic actuators 28, 33, 33a, 33b, and 33c; the multiple control valves 25 that control the flow rate and direction of the hydraulic working fluid fed from the hydraulic pump 23 to the hydraulic actuators 28, 33, 33a, 33b, and 33c based on the control signals (pilot pressures (hereinafter referred to also as Pi pressures)) output from the operating lever 26 or the proportional solenoid valves 27; multiple pressure sensors 41 for detecting the values of Pi pressures acting on the control valves 25; a controller 20 or a computer that calculates a target corrective Pi pressure based on the position or posture of the front work device 400 and other machine body information and outputs a command voltage capable of generating the target corrective Pi pressure to a proportional solenoid valve 27; and a target construction surface setting device 50 used to input to the controller 20 information on a target construction surface to be formed by the front work device 400.

The torque and flow rate of the hydraulic pump 23 are mechanically controlled such that the excavator operates in accordance with the target power (described later) of each hydraulic actuator, 28, 33, 33a, 33b, and 33c.

The control valves 25 are provided for their respective hydraulic actuators 28, 33, 33a, 33b, and 33c they control, but FIG. 2 shows them as a single component. Two Pi pressures act on each control valve 25 to move its internal spool in one shaft direction or the opposite direction. For example, a boom raising Pi pressure and a boom lowering Pi pressure act on the control valve 25 for the boom cylinder 33a.

The pressure sensors 41 are used to detect the Pi pressures acting on the respective control valves 25, and the number of the pressure sensors 41 provided is twice as large as that of the control valves. The pressure sensors 41 are provided right below the control valves 25 to detect the Pi pressures acting on the respective control valves 25.

Although multiple proportional solenoid valves 27 are provided, FIG. 2 shows them as a single block. The proportional solenoid valves 27 are classified into two types. One is pressure reducing valves that output the Pi pressures they receive from the operating lever 26 as they are or reduce those Pi pressures to the desired target corrective Pi pressures specified by command voltages before outputting. The other is pressure increasing values that reduce the Pi pressures they receive from the gear pump 24 to the desired target corrective Pi pressures specified by command voltages before outputting if Pi pressures larger than those output from the operating lever 26 are required. If a Pi pressure larger than that output from the operating lever 26 is required for a given control valve 25, a pressure increasing valve is used to generate it. In contrast, if a Pi pressure smaller than that output from the operating lever 26 is required, a pressure reducing valve is used to generate it. If the operating lever 26 is not outputting any Pi pressure, a pressure increasing valve is used to generate one. In other words, with the pressure increasing and reducing valves, a Pi pressure different from that output from the operating lever 26 (the latter being the Pi pressure generated by the operator's operation) is allowed to act on the control valve 25, whereby the control valve 25 can control its associated hydraulic actuator as desired by the operator.

For one control valve 25, there can be two pressure reducing valves and two pressure increasing valves at most. In the present embodiment, two pressure reducing vales and two pressure increasing valves are provided for the control valve 25 of the boom cylinder 33a. Specifically, the hydraulic excavator includes a first pressure reducing valve provided on a first line that directs a boom raising Pi pressure from the operating lever 26 to the control valve 25; a first pressure increasing valve provided on a second line that directs a boom raising Pi pressure from the gear pump 24 to the control valve 25 with the operating lever 26 bypassed; a second pressure reducing valve provided on a third line that directs a boom lowering Pi pressure from the operating lever 26 to the control valve 25; and a second pressure increasing valve provided on a fourth line that directs a boom lowering Pi pressure from the gear pump 24 to the control valve 25 with the operating lever 26 bypassed.

The proportional solenoid valves 27 of the present embodiment are provided only for the control valve 25 of the boom cylinder 33a, and no proportional solenoid valves 27 are provided for the control valves 25 of the other actuators 28, 33, 33b, and 33c. Thus, the arm cylinder 33b, the bucket cylinder 33c, the hydraulic swing motor 28, and the hydraulic travel motor 33 are driven based on the Pi pressures output from the operating lever 26.

In this application, the Pi pressures input to the control valve 25 of the boom cylinder 33a (control signals for the boom) are all referred to as "corrective Pi pressures (or corrective control signals)" regardless of whether correction of Pi pressures by the proportional solenoid valves 27 is done or not.

The controller 20 includes an input section; a central processing unit (CPU) which is a processor; a read-only memory (ROM) and random access memory (RAM), or storage devices; and an output section. The input section converts various information input to the controller 20 such that the CPU can perform calculations on it. The ROM is a recording medium on which are stored control programs for executing computational processing, described later, and various information needed to perform the processing. The CPU performs predetermined computational processing on the signals it receives from the input section, ROM, or RAM in accordance with the control programs stored on the ROM. The output section outputs commands for driving the engine 21 at target speeds and commands necessary for command voltages to act on the proportional solenoid valves 27. It should be noted that the storage devices are not limited to semiconductor memories such as ROMs and RAMs but can instead be magnetic recording devices such as hard disk drives.

The components connected to the controller 20 include the ECU 22; the multiple pressure sensors 41; two GNSS antennas 40; a bucket angle sensor 38; an arm angle sensor 37; a boom angle sensor 36; a machine body tilt angle sensor 39; multiple pressure sensors 42 for detecting the pressures of the hydraulic actuators 28, 33, 33a, 33b, and 33c; multiple speed sensors 43 for detecting the operational speeds of the hydraulic actuators 28, 33, 33a, 33b, and 33c; and the target construction surface setting device 50.

The controller 20 calculates the position of the machine body relative to a target construction surface 60 based on input signals from the GNSS antennas 40 and calculates the posture of the front work device 400 based on input signals from the bucket angle sensor 38, the arm angle sensor 37, the boom angle sensor 36, and the machine body tilt angle sensor 39. To put it another way, in the present embodiment, the GNSS antennas 40 act as position sensors while the bucket angle sensor 38, the arm angle sensor 37, the boom angle sensor 36, and the machine body tilt angle sensor 39 act as posture sensors. The tilt angle of the machine body can be calculated from input signals from the two GNSS antennas 40.

In the present embodiment, stroke sensors are used as the speed sensors 43 for the hydraulic cylinders 33a, 33b, and 33c. Also, as the pressure sensors 42 for the hydraulic cylinders 33a, 33b, and 33c, each of the hydraulic cylinders 33a, 33b, and 33c includes a bottom pressure sensor and a rod pressure sensor.

The methods disclosed herein for calculating the machine body position, the posture of the front work device 400, and the pressures and speeds of the respective actuators are only meant to be examples, and any known methods can be employed for those purposes.

The target construction surface setting device 50 is an interface through which to input information on the target construction surface 60 (see FIG. 15) (the information including positional information and tile angle information on each target construction surface). The target construction surface setting device 51 is connected to an external terminal (not illustrated) that stores the three-dimensional data of target construction surfaces defined in a global coordinate system (absolute coordinate system), and the information on the target construction surfaces input from the external terminal is stored on the storage devices of the controller 20 via the target construction surface setting device 51. Instead, the operator can manually input target construction surfaces via the target construction surface setting device 50.

<2. Computational Configuration of the Controller 20>

Figure 3:
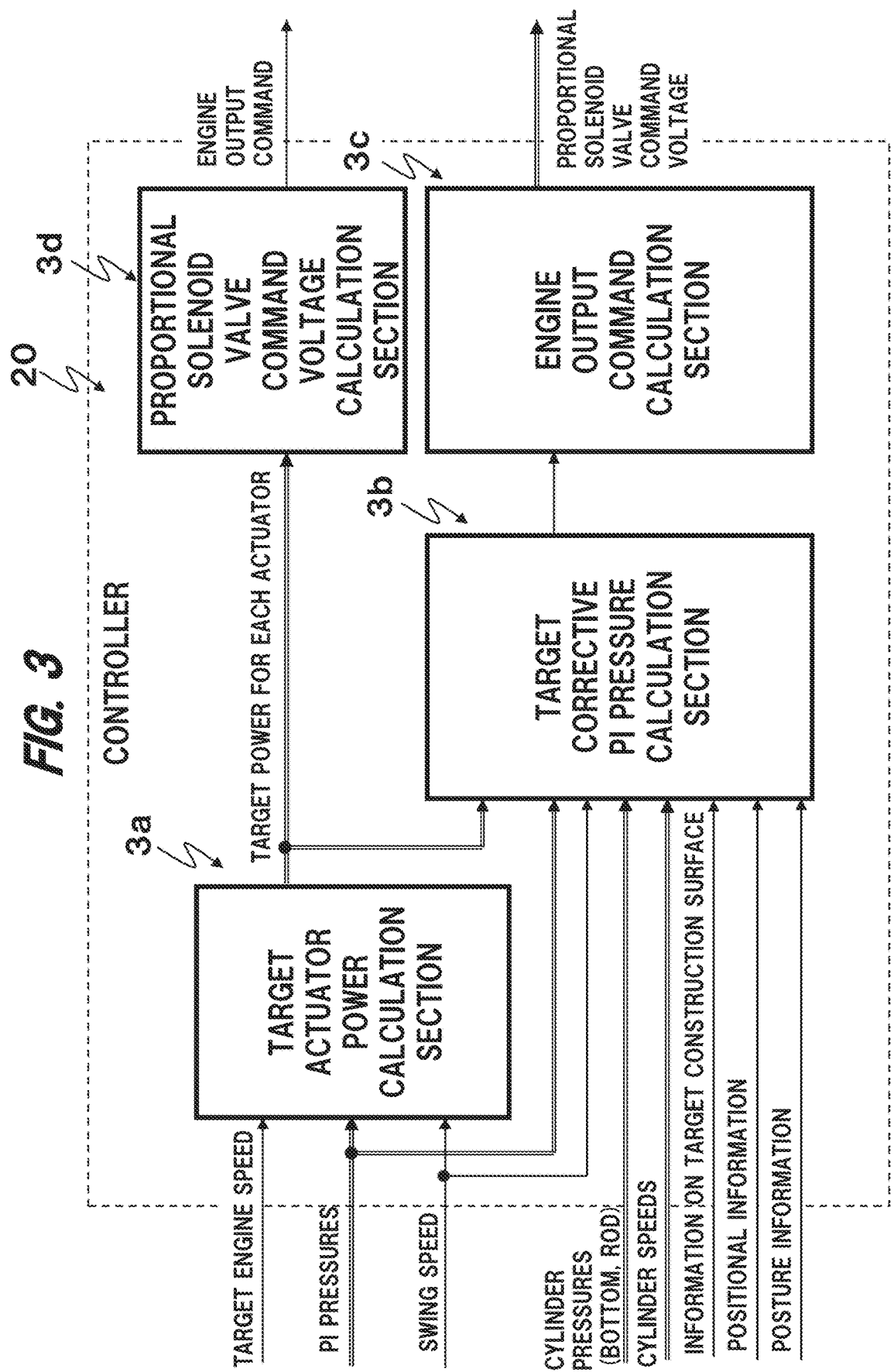
FIG. 3 is a diagram illustrating the computational configuration of a controller 20.

FIG. 3 is a diagram illustrating the computational configuration of the controller 20. The controller 20 includes a target actuator power calculation section 3a for calculating target powers for the hydraulic cylinders 33a, 33b, and 33c and the hydraulic swing motor 28; a target corrective Pi pressure calculation section 3b for calculating a target corrective Pi pressure for the boom cylinder 33a (the boom 405); a proportional solenoid valve command voltage calculation section 3c for calculating command voltages (proportional solenoid valve command voltages) for the four proportional solenoid valves 27 (the first and second pressure reducing valves and the first and second pressure increasing valves) of the boom cylinder 33a based on the target corrective Pi pressure; and an engine output command calculation section 3d for calculating an engine output command to be output to the ECU 22.

<2.1. Target Actuator Power Calculation Section 3a>

Figure 4:
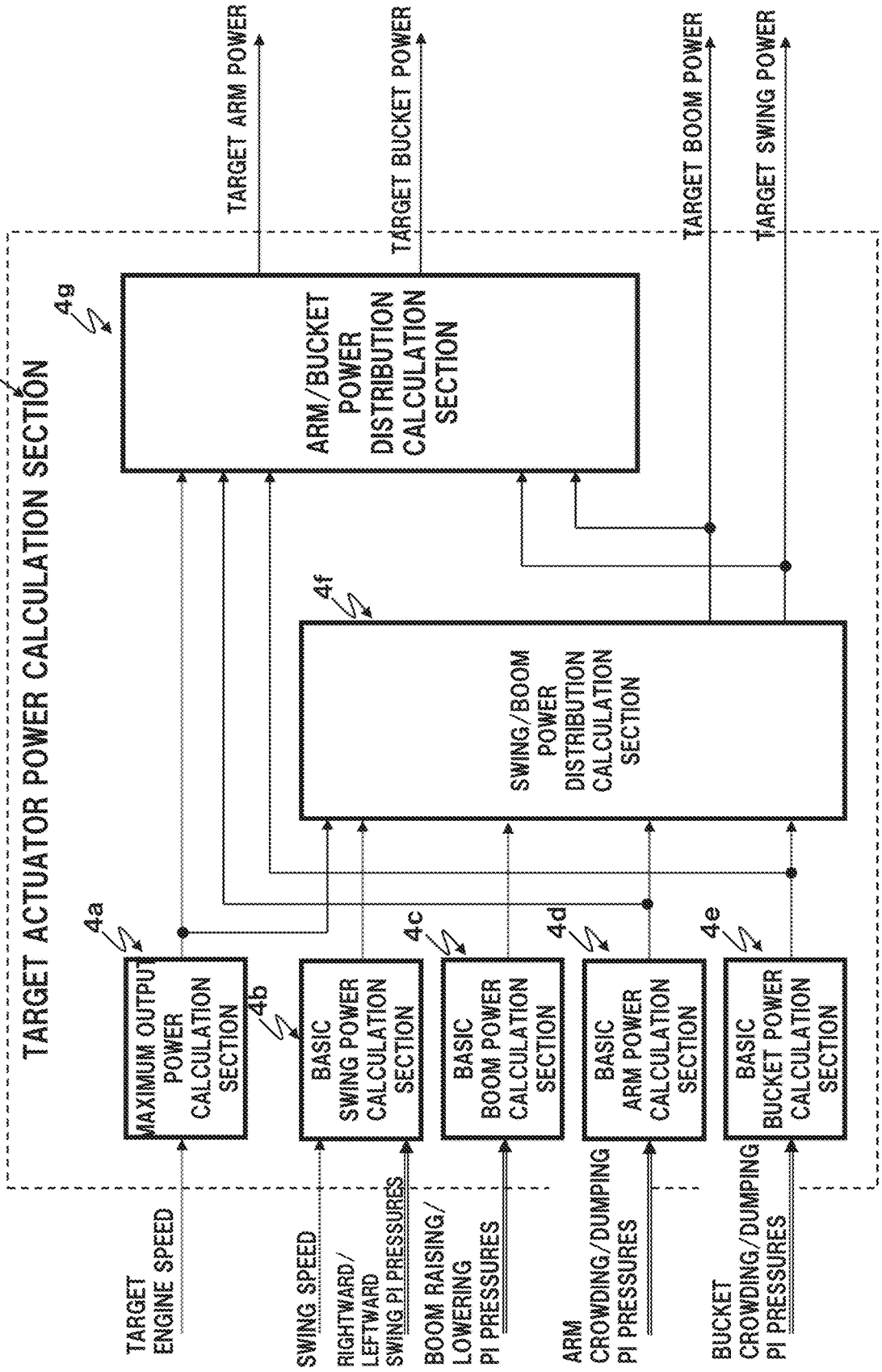

FIG. 4 illustrates the target actuator power calculation section 3a in greater detail. The target actuator power calculation section 3a includes a maximum output power calculation section 4a, a basic swing power calculation section 4b, a basic boom power calculation section 4c, a basic arm power calculation section 4d, a basic bucket power calculation section 4e, a swing/boom power distribution calculation section 4f, and an arm/bucket power distribution calculation section 4g and calculates target powers for the hydraulic cylinders 33a, 33b, and 33c and the hydraulic swing motor 28.

Figure 5:
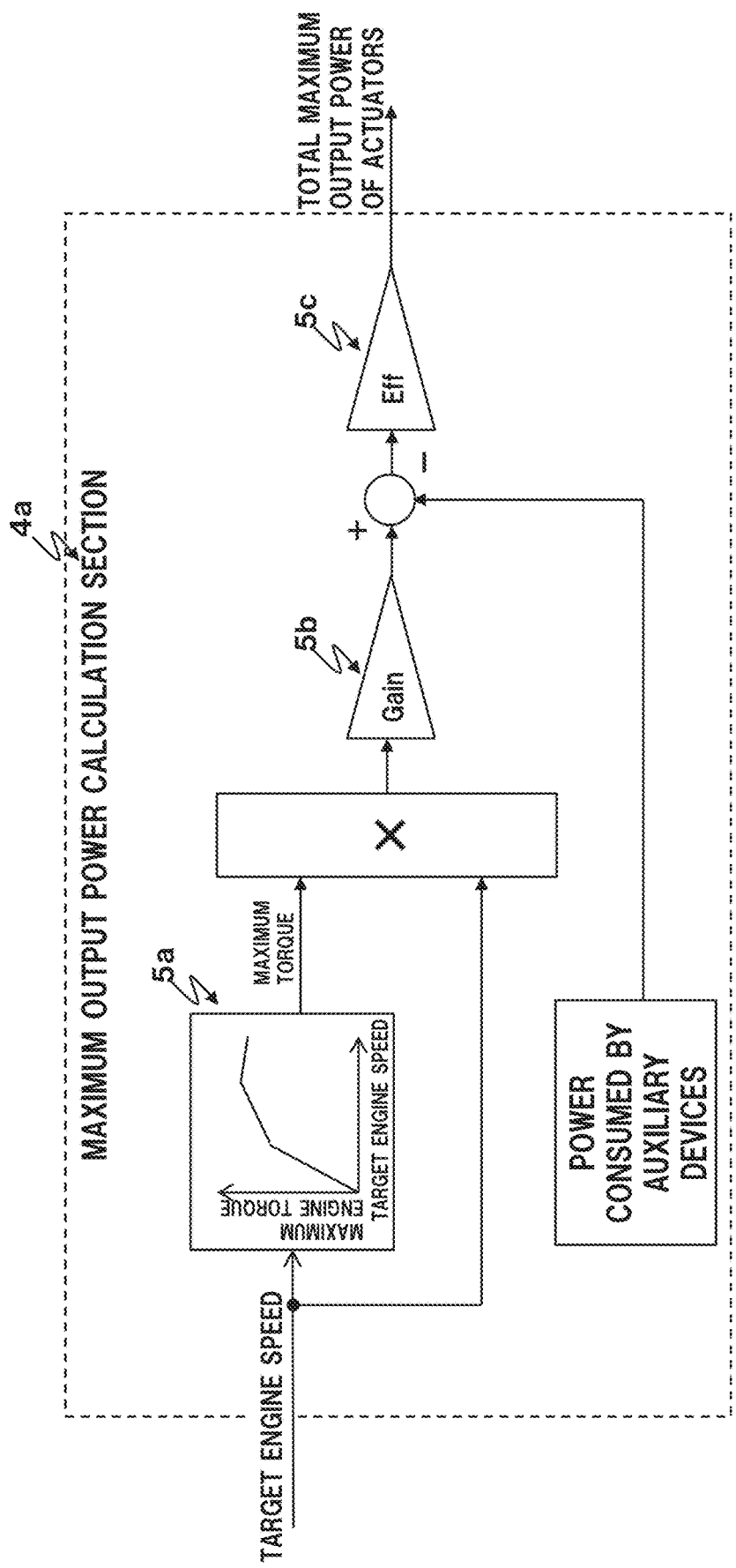

FIG. 5 illustrates the maximum output power calculation section 4a in greater detail. The maximum output power calculation section 4a receives an engine target speed from the ECU 22. The maximum output power calculation section 4a calculates the maximum actuator power by multiplying the maximum torque obtained by inputting the engine target speed to an engine speed maximum torque table 5a by the engine target speed, applying to the product a coefficient that converts it into the dimension of output power at a gain section 5b, subtracting from the coefficient-applied value the power consumed by auxiliary devices (air conditioner, radio, or other devices installed on the hydraulic excavator), and finally multiplying the obtained value by efficiency at an Eff section 5c. The "efficiency" used at the Eff section 5c can be a typical value of the efficiency with which the output power input to the hydraulic pump 23 is converted into the actuators' work; more specifically, it can be determined from an efficiency table in which engine output power is used as input. With the above calculations, the total maximum output power of the actuators can be obtained.

Figure 6:
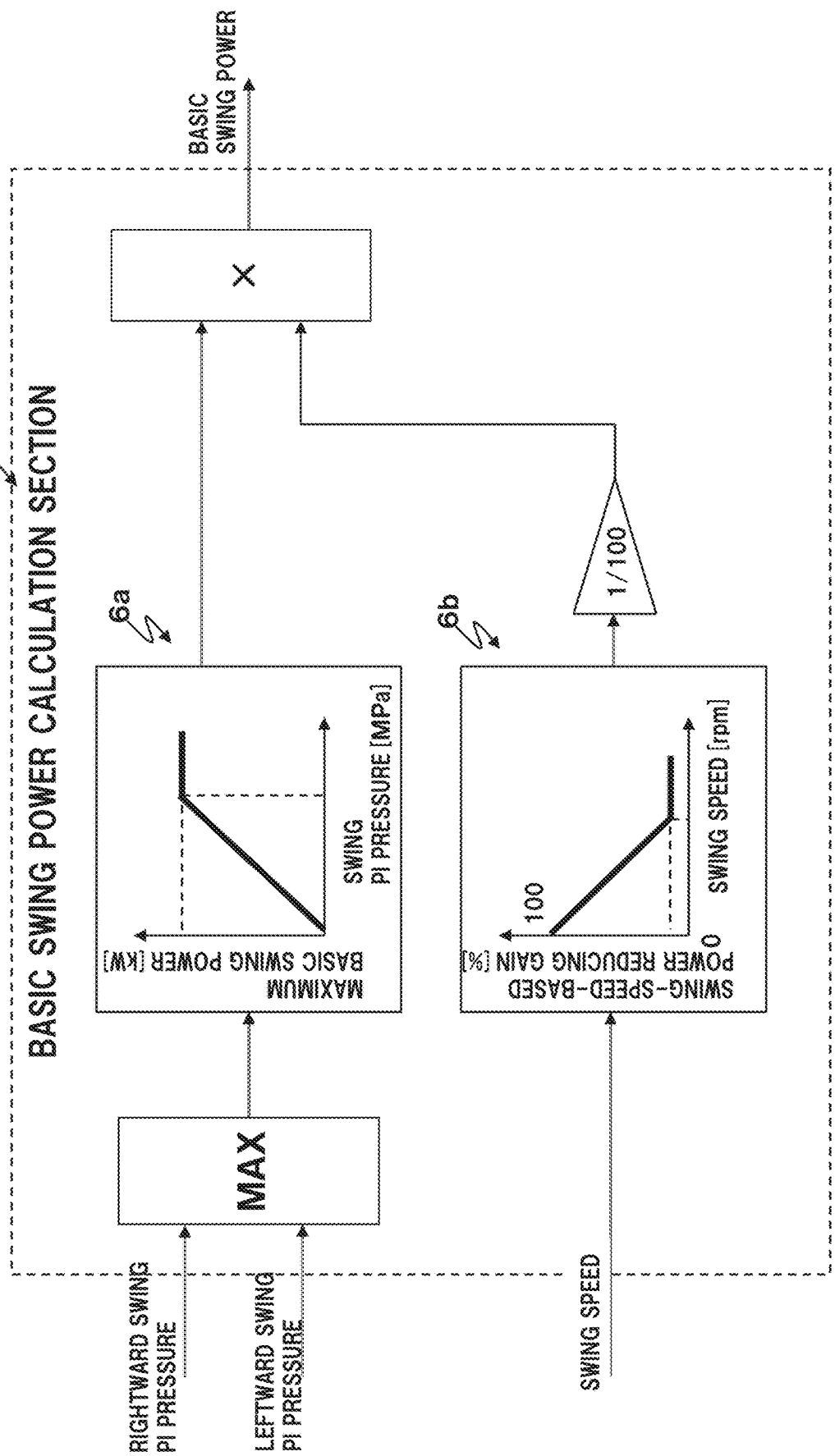
FIG. 6 is a detailed diagram of a basic swing power calculation section 4b.

FIG. 6 illustrates the basic swing power calculation section 4b in greater detail. The basic swing power calculation section 4b receives the rightward swing Pi pressure (rightward swing operation amount) and leftward swing Pi pressure (leftward swing operation amount) of the swing structure 402 obtained by the pressure sensors 41 and the swing speed of the swing structure 402 obtained by the speed sensors 43 to calculate basic swing output power, or target power at the time of a swing operation alone. First, the maximum value of the rightward and leftward swing Pi pressures is input to a maximum basic swing power table 6a to determine maximum basic swing power. The table is set such that the maximum basic swing power increases monotonously relative to increases in swing Pi pressure. The swing speed is then input to a swing power reducing gain table 6b to determine a power reducing gain. The basic swing power is determined by multiplying the maximum basic swing power by the power reducing gain. The swing power reducing gain table 6b is set such that power reducing gain decreases monotonously relative to increases in swing speed. This is because the greatest power is required at the beginning of a swing motion and the power required decreases right after the swing motion. Thus, it is preferred that tuning be performed to ensure a smooth swing feeling.

Figure 7:
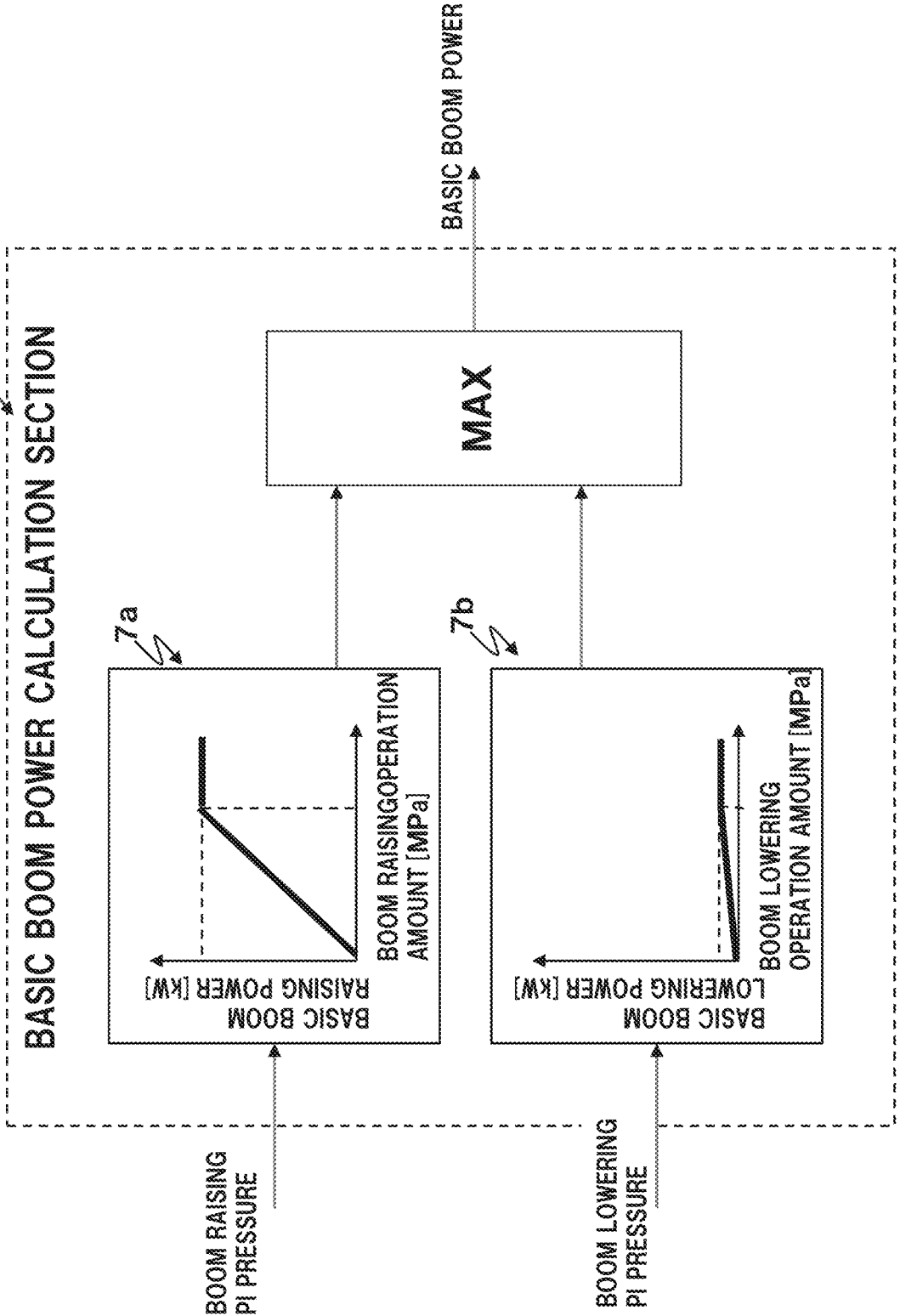
FIG. 7 is a detailed diagram of a basic boom power calculation section 4c.

FIG. 7 illustrates the basic boom power calculation section 4c in greater detail. The basic boom power calculation section 4c receives a boom raising Pi pressure (boom raising operation amount) and a boom lowering Pi pressure (boom lowering operation amount) to calculate basic boom power. The boom raising Pi pressure and the boom lowering Pi pressure are respectively input to a basic boom raising power table 7a and a basic boom lowering power table 7b and converted into basic boom raising power and basic boom lowering power, the larger of which is used the basic boom power. As with a swing operation, the tables are set such that the basic powers increase monotonously relative to increases in Pi pressure (operation amount). Each of the basic powers represents the power required at the time of a boom operation alone.

Similar to the basic boom power calculation section 4c, the basic arm power calculation section 4d and the basic bucket power calculation section 4e calculate respective basic powers. The calculation performed by the calculation sections 4d and 4e will not be described because it is the same as that shown in FIG. 7 except that the word "boom" needs to be changed to "arm" or "bucket."

Figure 8:
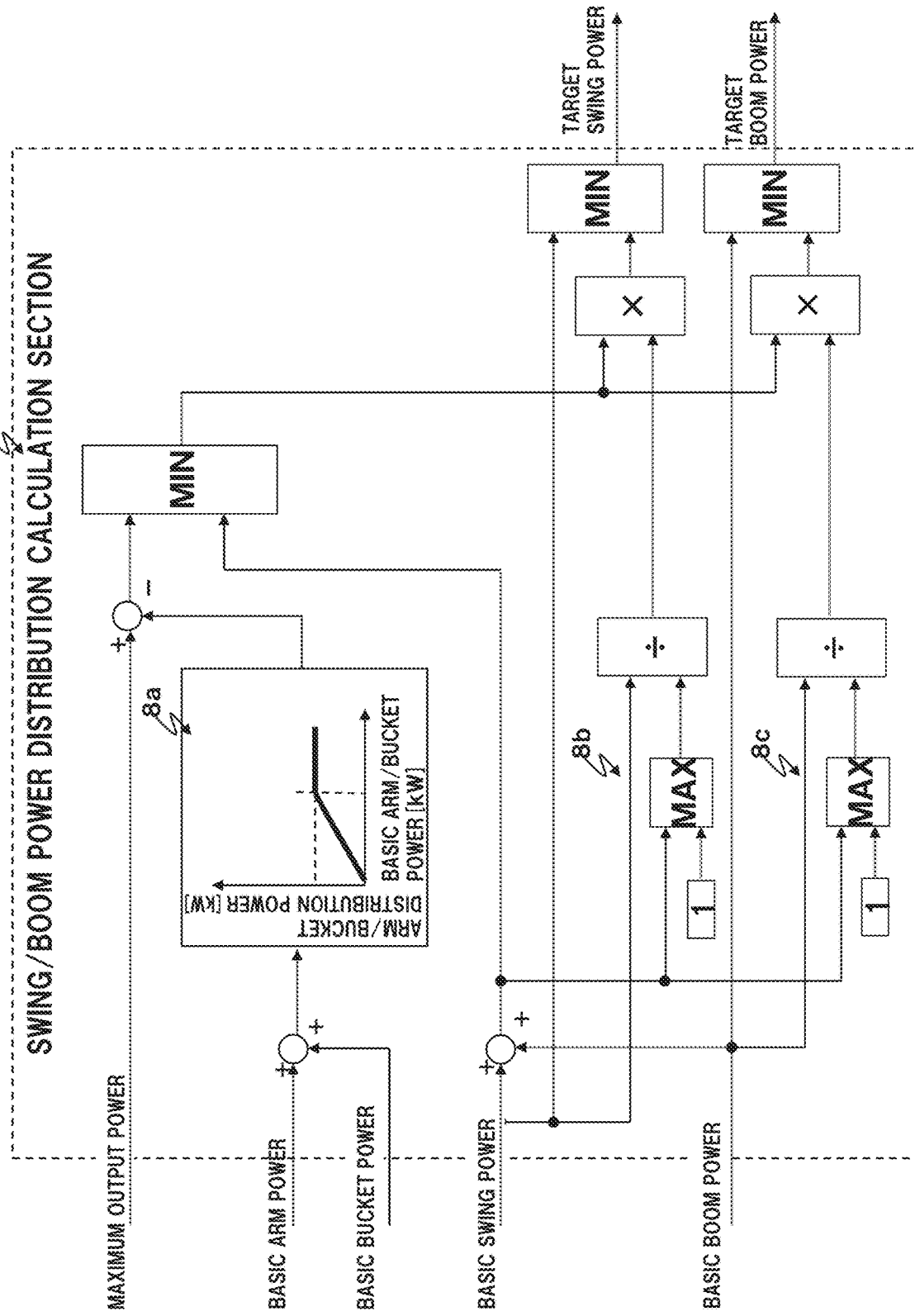
FIG. 8 is a detailed diagram of a swing/boom power distribution calculation section 4f.

FIG. 8 illustrates the swing/boom power distribution calculation section 4f in greater detail. The swing/boom power distribution calculation section 4f receives the maximum power calculated by the maximum output power calculation section 4a, the basic swing power calculated by the basic swing power calculation section 4b, the basic boom power calculated by the basic boom power calculation section 4c, the basic arm power calculated by the basic arm power calculation section 4d, and the basic bucket power calculated by the basic bucket power calculation section 4e to calculate target swing power and target boom power.

First, the swing/boom power distribution calculation section 4f inputs the sum of the basic arm power and the basic bucket power to an arm/bucket distribution power table 8a to calculate arm/bucket distribution power. The arm/bucket distribution power table 8a is also set such that its output increases monotonously relative to increases in its input or basic power, but the output stays smaller than the input. The reason is that because the system of the present embodiment prioritizes boom and swing output powers over arm and bucket output powers, a certain amount of output power needs to be secured for the arm and the bucket when those are operated at the same time.

Next, the swing/boom power distribution calculation section 4f uses a swing ratio calculation section 8b to calculate the ratio of the basic swing power to the sum of the basic swing power and the basic boom power and uses a boom ratio calculation section 8c to calculate the ratio of the basic boom power to the sum of the basic swing power and the basic boom power. The arm/bucket distribution power output from the table 8a is then subtracted from the maximum output power input from the maximum output power calculation section 4a. The smaller of the value obtained by the subtraction and the basic swing power is distributed for a swing motion and the boom based on the ratios obtained at the ratio calculation sections 8b and 8c to determine target swing power and target boom power.

Figure 9:
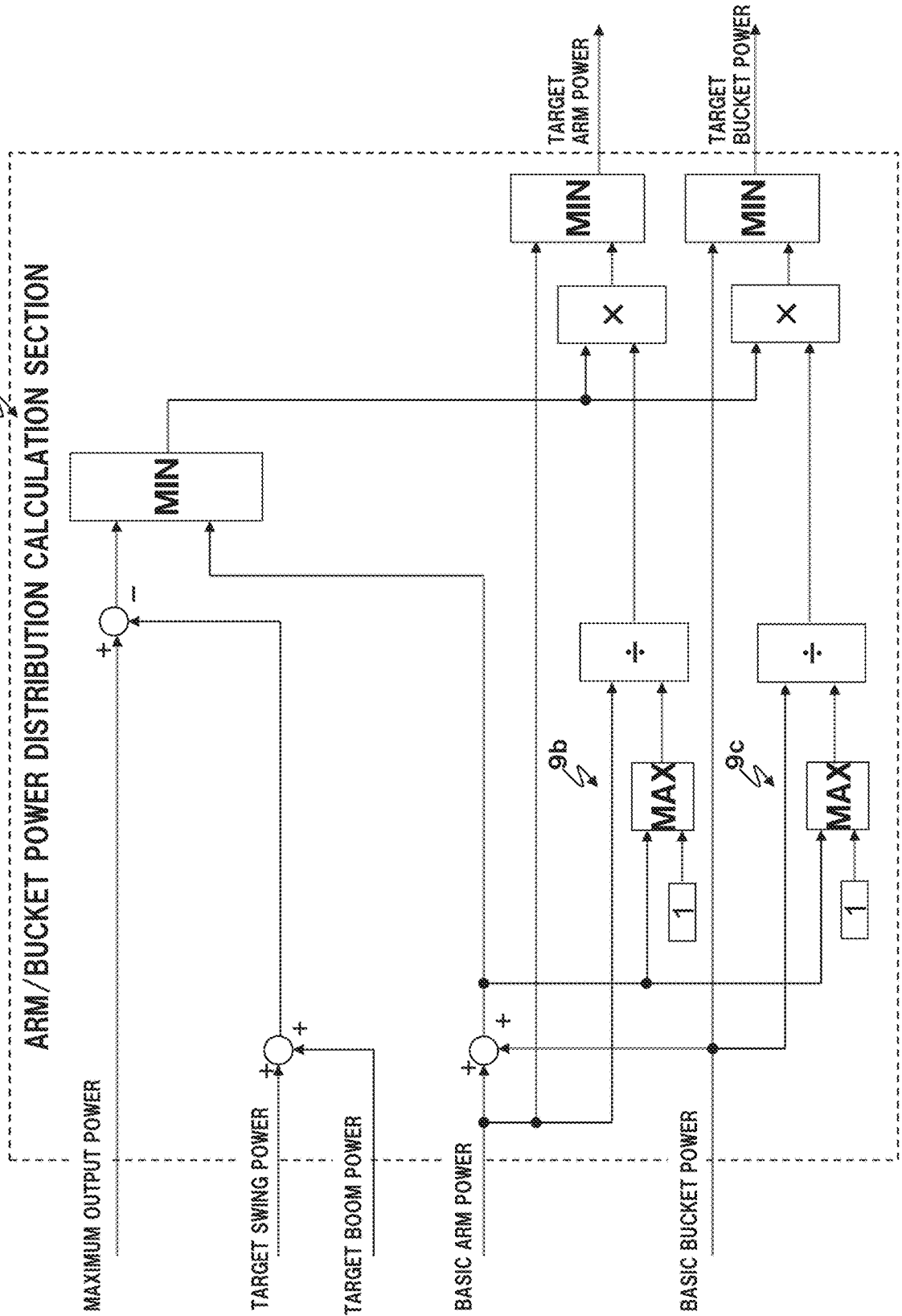
FIG. 9 is a detailed diagram of an arm/bucket distribution power calculation section 4g.

FIG. 9 illustrates the arm/bucket distribution power calculation section 4g in greater detail. The arm/bucket distribution power calculation section 4g receives the maximum power calculated by the maximum output power calculation section 4a, the target swing power and target boom power calculated by the swing/boom power distribution calculation section 4f, the basic arm power calculated by the basic arm power calculation section 4d, and the basic bucket power calculated by the basic bucket power calculation section 4e to calculate target arm power and target bucket power.

The arm/bucket distribution power calculation section 4g uses an arm ratio calculation section 9b to calculate the ratio of the basic arm power to the sum of the basic arm power and the basic bucket power and uses a bucket ratio calculation section 9c to calculate the ratio of the basic bucket power to the sum of the basic arm power and the basic bucket power. The sum of the target swing power and the target boom power is then subtracted from the maxim output power, and the smaller of the resultant value and the basic arm power is distributed to the arm and the bucket based on the ratios calculated by the ratio calculation sections 9b and 9c to determine the target arm power and the target bucket power.

<2.2. Target Corrective Pi Pressure Calculation Section 3b>

Figure 10:
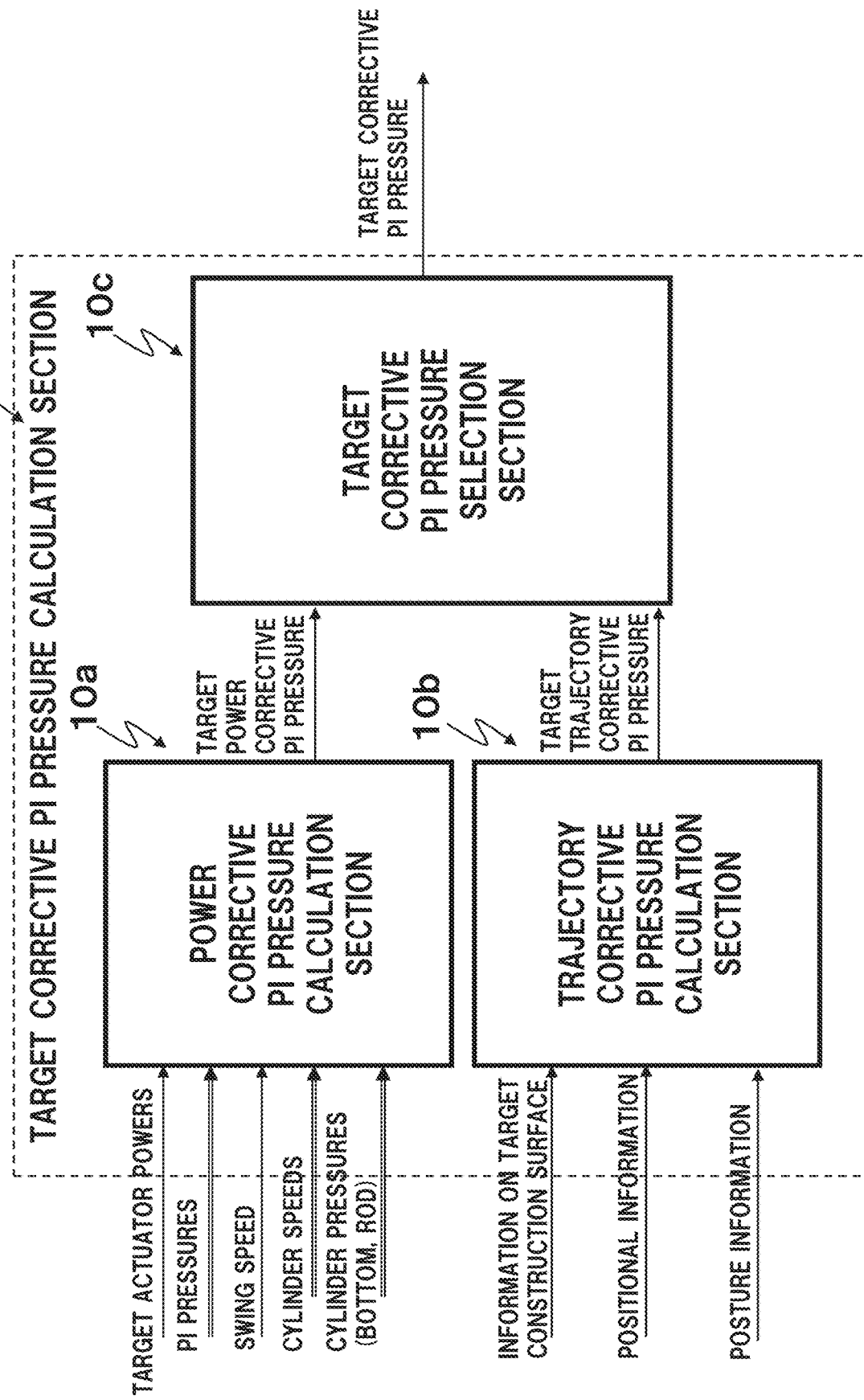
FIG. 10 is a detailed diagram of a target corrective Pi pressure calculation section 3b.

FIG. 10 illustrates the target corrective Pi pressure calculation section 3b in greater detail. The target corrective Pi pressure calculation section 3b includes a power corrective Pi pressure calculation section 10a, a trajectory corrective Pi pressure calculation section 10b, and a target corrective Pi pressure selection section 10c. The target corrective Pi pressure calculation section 3b calculates a target corrective Pi pressure (referred to as "power corrective Pi pressure") for the boom cylinder 33a (boom 405) to achieve appropriate power for the arm 406 or the bucket 407 and also calculates a target corrective Pi pressure (referred to as "trajectory corrective Pi pressure") for the boom cylinder 33a (boom 405) for maintaining the motion trajectory of the front work device 400 above a target construction surface 60. The target corrective Pi pressure calculation section 3b selects one of the two pressures based on predetermined conditions and outputs it as a target corrective Pi pressure for the boom cylinder 33a (boom 405). In the following, a Pi pressure commanding boom raising is "positive," while a Pi pressure commanding boom lowering is "negative."

<2.2.1. Power Corrective Pi Pressure Calculation Section 10a>

Figure 11:
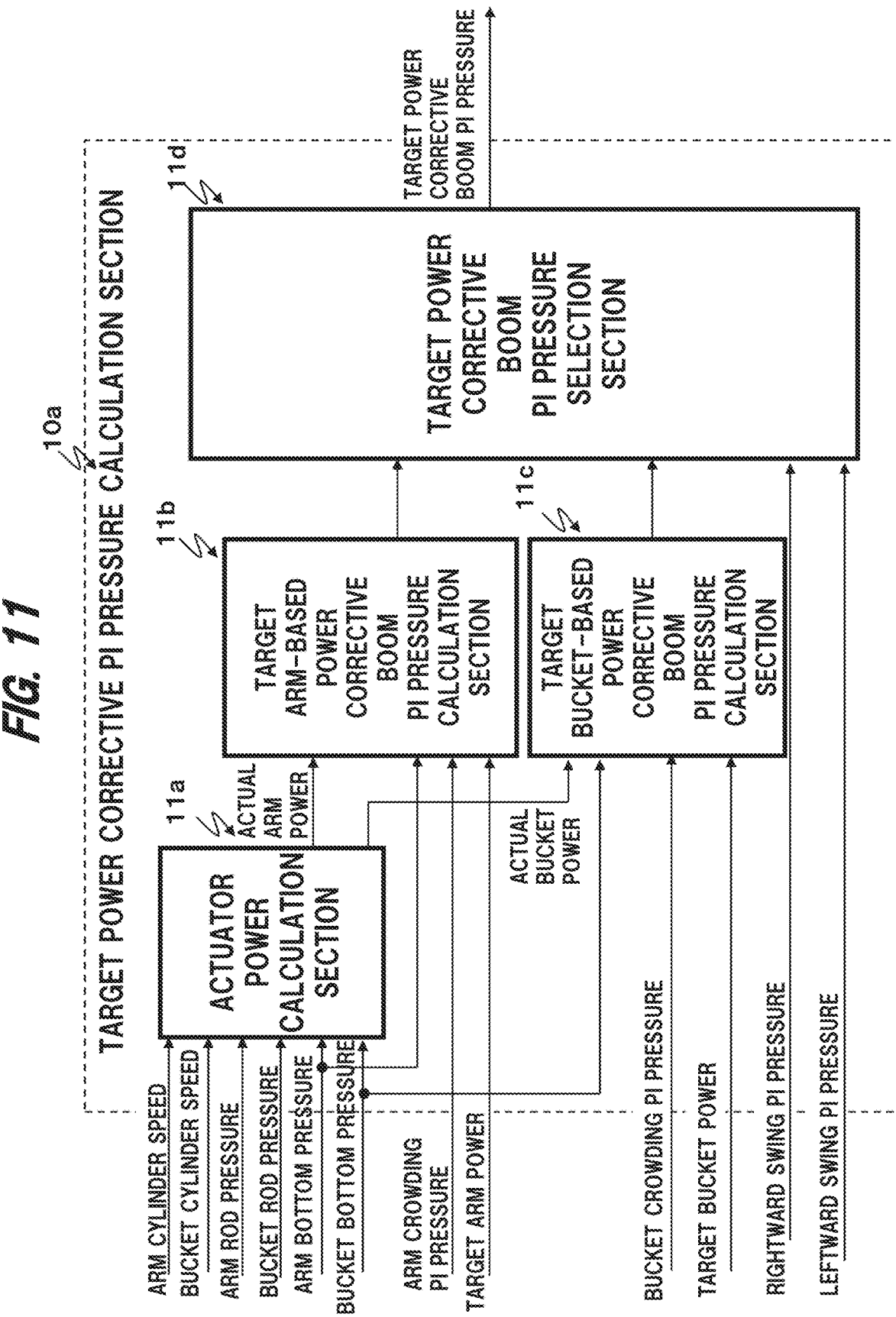

FIG. 11 illustrates the power corrective Pi pressure calculation section 10a in greater detail. The power corrective Pi pressure calculation section 10a includes an actuator power calculation section 11a, a target arm-based power corrective boom Pi pressure calculation section 11b, a target bucket-based power corrective boom Pi pressure calculation section 11c, and a target power corrective boom Pi pressure selection section 11d. The power corrective Pi pressure calculation section 10a calculates a corrective Pi pressure (target power corrective Pi pressure) for the boom cylinder 33a (boom 405) to achieve appropriate power for the arm 406 or the bucket 407.

The power corrective Pi pressure calculation section 10a is designed to perform calculations based on the following criteria (1) through (4).

(1) During excavation (while at least arm crowding or bucket crowding is performed (the same applies below)), if the differences between the target actuator powers (target powers) and the actual actuator powers (actual powers) of the arm 406 and the bucket 407 are each smaller than a predetermined output power value W1, it is determined that the arm 406 and the bucket 407 are performing their work under an appropriate load, and the controller 20 does not perform any load adjustment through automatic raising and lowering of the boom 405 (machine control). In other words, the Pi pressure of the boom 405 will not be corrected.

(2) During excavation, if the differences between the target actuator powers and the actual actuator powers of the arm 406 and the bucket 407 are each larger than a predetermined output power P1 and the bottom pressures (drive pressures) of the actuators 33b and 33c of the arm 406 and the bucket 407 are each smaller than the predetermined output power value P1, it is determined that the actuators 33b and 33c are not fully performing their work with the loads being too small, and the work efficiency of the actuators 33b and 33c (the amounts of soil they can excavate in a given amount of time) are increased through automatic boom lowering. In other words, the Pi pressure of the boom 405 is corrected to a negative value.

(3) During excavation, if the differences between the target actuator powers and actual actuator powers of the arm 406 and the bucket 407 are each larger than the predetermined output power value W1 and the actuator pressures of the arm 406 and the bucket 407 are each larger than the predetermined output power P1, it is determined that the actuators 33b and 33c are not being capable of performing their work with the loads being too large, and the work efficiency of the actuators 33b and 33c (the amounts of soil they can excavate in a given amount of time) are increased through automatic boom raising to reduce the loads of the actuators 33b and 33c. In other words, the Pi pressure of the boom 405 is corrected to a positive value.

(4) If operational commands issued through the operating lever 26 include a swing command for the swing structure 402, the control operations of (2) and (3) are not performed. In other words, the Pi pressure of the boom 405 is not corrected. The reason is that automatic operation of the boom 405 can be inconvenient for the operator when the excavator is performing ditching in which it excavates soil while pressing the bucket 407 against a side surface by performing a swing operation during the excavation.

We next describe the detailed calculations performed by the above calculation sections 11a, 11b, 11c, and 11d.

The actuator power calculation section 11a receives the arm cylinder speed and bucket cylinder speed calculated from output values of speed sensors 43 and the bottom and rod pressures of the arm cylinder 33b and bucket cylinder 33c calculated from output values of pressure sensors 42 to calculate the actual powers of the arm 406 and the bucket 407 (the actual powers of the actuators 33b and 33c). Generally, each of the actual actuator powers (ActPwr) can be represented by the formula below where $R_{rod}$ is the rod radius of a cylinder, $R_{btm}$ is the bottom radius of the cylinder, $V_{syl}$ is the cylinder velocity, $P_{btm}$ is the cylinder bottom pressure, and $P_{rod}$ is the cylinder road pressure.

$$\text{ActPwr} = \{R_{btm}^2 \times P_{btm} - (R_{btm}^2 - R_{rod}^2) \times P_{rod}\} \times 2\pi V_{syl}$$

The actuator power calculation section 11a uses this formula to calculate the actual powers of the arm 406 and the bucket 407. Given the calculation performed by the next calculation section 11b, however, the output power calculation can be skipped at the time of arm dumping and bucket dumping.

Figure 12:
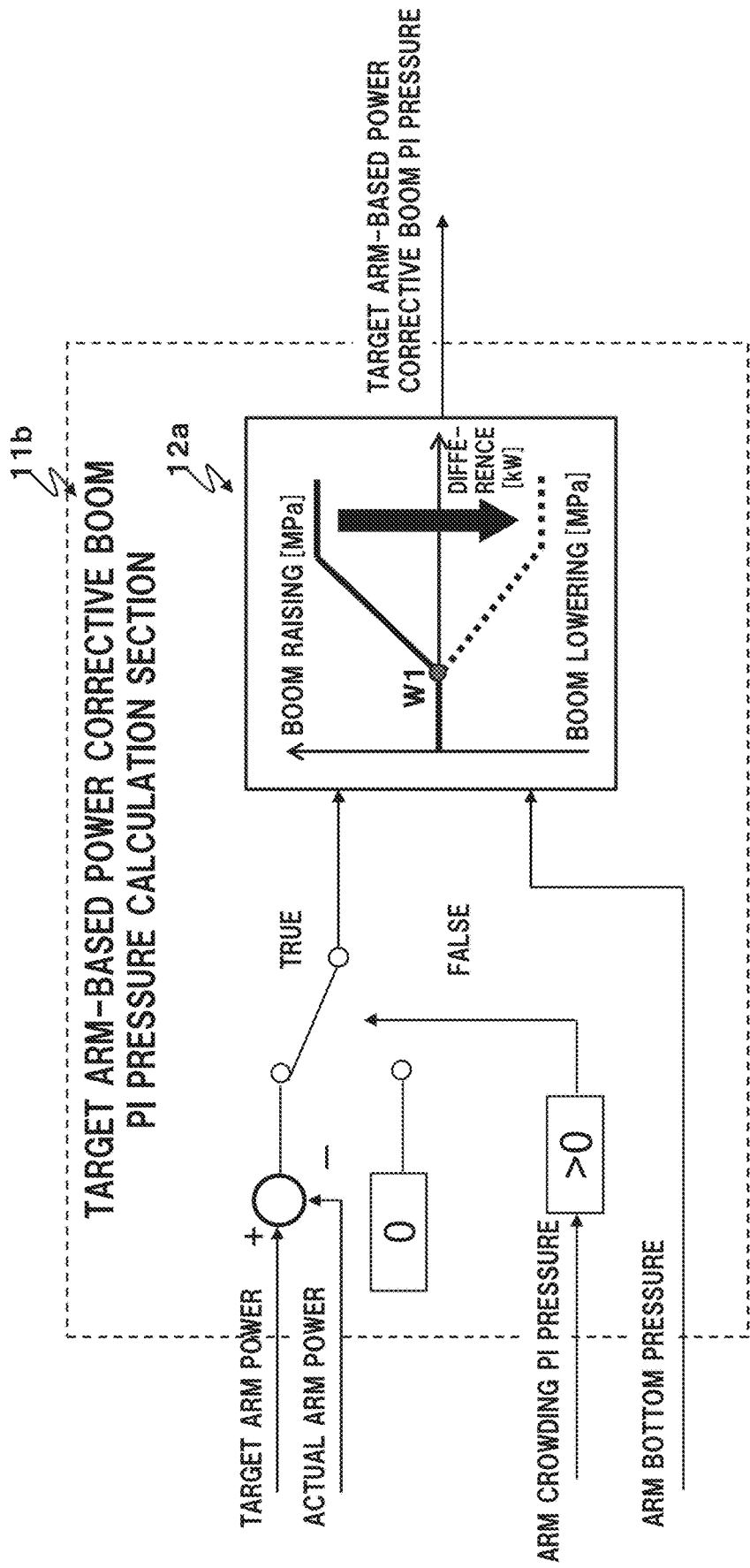
FIG. 12 is a detailed diagram of a target arm-based power corrective boom Pi pressure calculation section 11b.

FIG. 12 illustrates the target arm-based power corrective boom Pi pressure calculation section 11b in greater detail. The target arm-based power corrective boom Pi pressure calculation section 11b uses the difference between the target power and actual power of the arm 406 at the time of arm crowding, the arm bottom pressure (drive pressure of the arm cylinder 33b), and a target arm-based power corrective boom Pi pressure table 12a to calculate a target power corrective Pi pressure (target arm-based power corrective boom Pi pressure) for the boom 405 for performing boom raising and lowering.

The target arm-based power corrective boom Pi pressure table 12a is formed based on the above criteria (1) to (3). The table 12a is a three-dimensional table in which the difference between the target arm power and the actual arm power is first input and the arm bottom pressure is second input and outputs the target power corrective Pi pressure. In the table 12a, the plus (+) side of the vertical axis represents a target corrective Pi pressure for boom raising, and the minus (−) side represents a target corrective Pi pressure for boom lowering. When the difference between the target arm power and the actual arm power exceeds the output power value W1, a target corrective Pi pressure is generated for the boom 405. The solid line in the table 12a represents the arm bottom pressure when it is equal to the relief pressure (when it is the largest), and the solid line will shift toward the dotted line as the arm bottom pressure decreases. The dotted line in the table 12a represents the arm bottom pressure when the bucket is in the air with no load on it (i.e., when the arm bottom pressure is the smallest). The table 12 is designed such that when the arm bottom pressure is equal to a pressure P1, a graph defining target corrective boom Pi pressure matches the horizontal axis of the table 12a. As a result, in the case of automatic boom operation, if the arm bottom pressure is larger than the pressure P1, boom raising is performed. If the arm bottom pressure is smaller than the pressure P1, boom lowering is performed. If the difference between the target arm power and the actual arm power exceeds the output power value W1, the target arm-based power corrective boom Pi pressure increases monotonously up to a predetermined value. The predetermined value can be, for example, the value corresponding to the Pi pressure output when the operating lever 26 is moved half as much as in a full operation.

The target arm-based power corrective boom Pi pressure calculation section 11b receives arm crowding Pi pressure. When the arm crowding Pi pressure is 0, an arm dumping operation is being performed (no excavation is being performed). In that case, which is out of the purposes of the present control, the difference between the target arm power and the actual arm power is fixed to 0, and the target arm-based power corrective boom Pi pressure is also set to 0 by the table 12a.

The target bucket-based power corrective boom Pi pressure calculation section 11c determines a target bucket-based power corrective boom Pi pressure in a manner similar to the target arm-based power corrective boom Pi pressure calculation section 11b. The calculation performed by the target bucket-based power corrective boom Pi pressure calculation section 11c will not be described because it is the same as that shown in FIG. 12 except that the word "arm" needs to be changed to "bucket." The target bucket-based power corrective boom Pi pressure calculation section 11c also uses a table similar to the table 12a of FIG. 12, which can have characteristics different from those of the table 12a.

Figure 13:
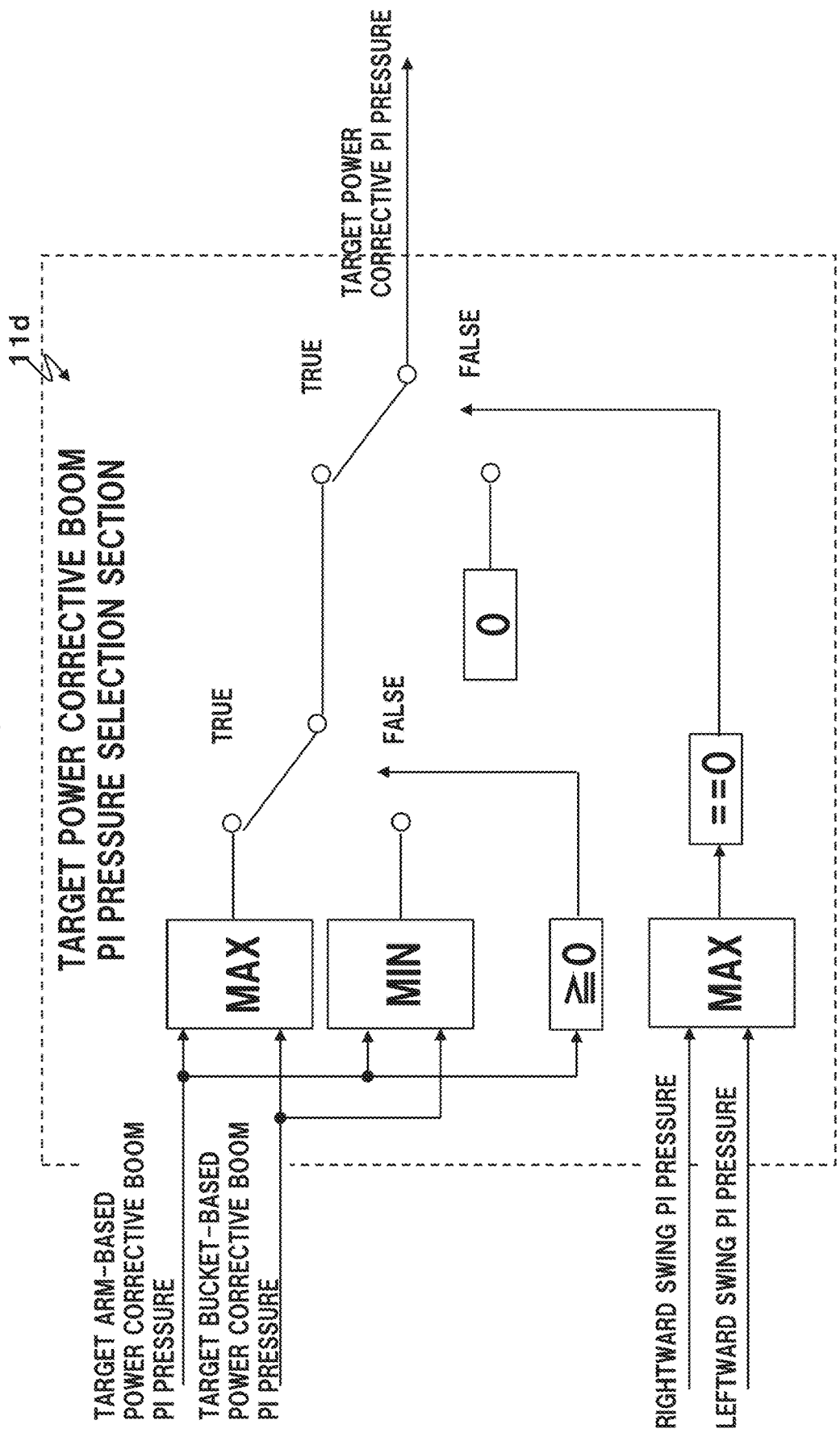
FIG. 13 is a detailed diagram of a target power corrective boom Pi pressure selection section 11d.

FIG. 13 illustrates the target power corrective boom Pi pressure selection section 11d in greater detail. The target power corrective boom Pi pressure selection section 11d selects either the target arm-based power corrective boom Pi pressure calculated by the calculation section 11b or the target bucket-based power corrective boom Pi pressure calculated by the calculation section 11c and outputs it to the target corrective Pi pressure selection section 10c.

It is not unusual for the arm 406 of the excavator to stop operating due to overload during excavation (arm crowding). Thus, in the present embodiment, the value obtained by the calculation section lib is selected preferentially to prioritize the boom operation demanded by the arm 406. Specifically, when the target arm-based boom power corrective Pi pressure is equal to or greater than 0 or boom raising is demanded, the maximum value of the target arm-based boom power corrective Pi pressure and the target bucket-based boom power corrective Pi pressure is selected to use it as a target boom power corrective Pi pressure. If, on the other hand, the target arm-based boom power corrective Pi pressure is negative or boom lowering is demanded, the minimum value of the two pressures is selected to use it as a target boom power corrective Pi pressure. With this, if the target arm-based boom power corrective Pi pressure and the target bucket-based boom power corrective Pi pressure differ in terms of positive and negative signs, the target arm-based boom power corrective Pi pressure is always selected. However, when a swing command is input through the operating lever 26, the target boom power corrective Pi pressure is set to 0 based on the above criterion (4).

<2.2.2. Target Trajectory Corrective Pi Pressure Calculation Section 10b>

Figure 14:
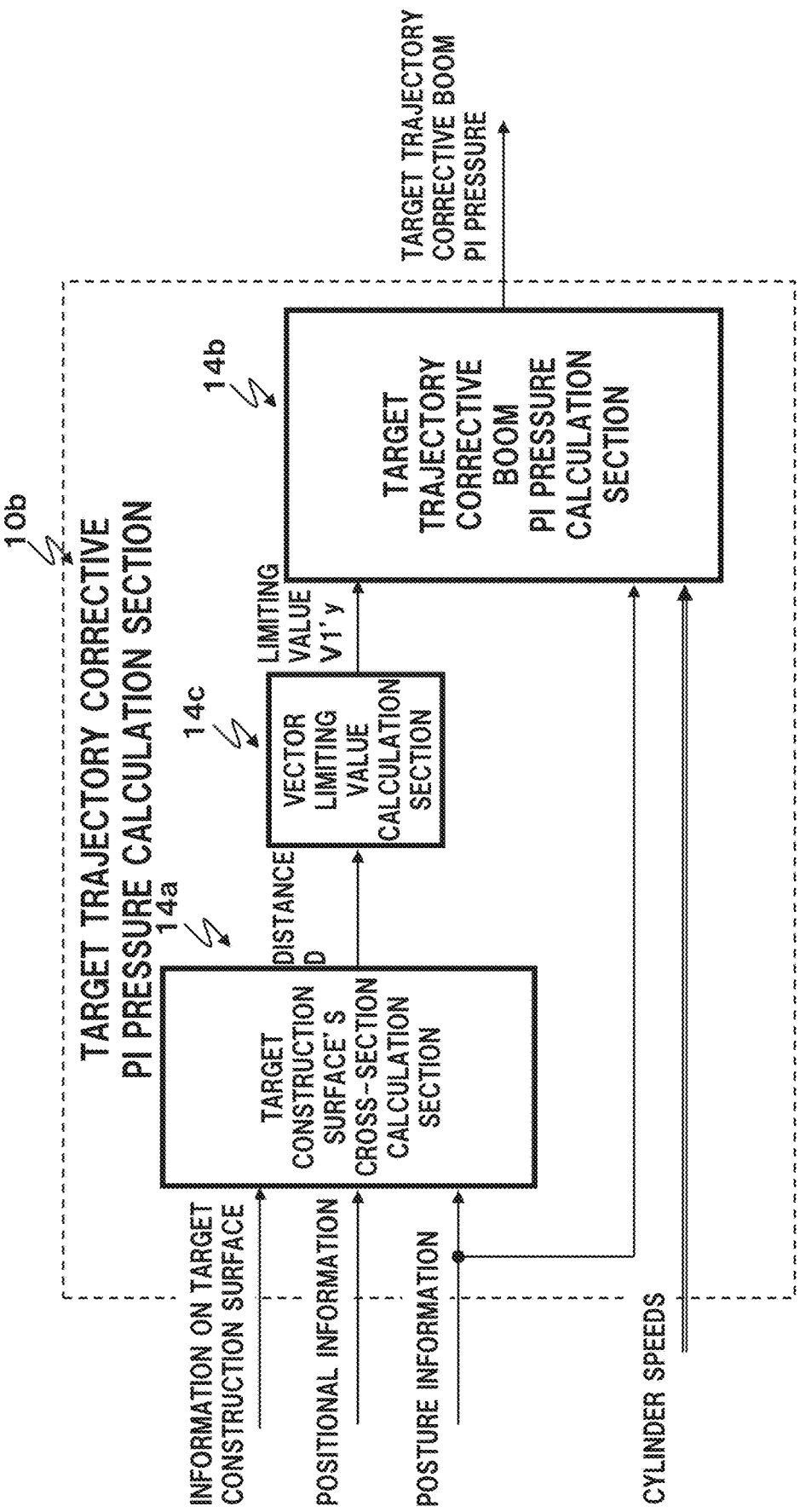
FIG. 14 is a detailed diagram of a trajectory corrective Pi pressure calculation section 10b.

FIG. 14 illustrates the target trajectory corrective Pi pressure calculation section 10b in greater detail. The target trajectory corrective Pi pressure calculation section 10b includes a target construction surface's cross-section calculation section 14a, a vector limiting value calculation section 14c, and a target trajectory corrective boom Pi pressure calculation section 14b and calculates a target corrective Pi pressure (target trajectory corrective boom Pi pressure) for the boom cylinder 33a (boom 405) based on the distance D from the front work device 400 to a target construction surface such that the motion trajectory of the front work device 400 is maintained above the target construction surface.

The target construction surface's cross-section calculation section 14a receives information on a target construction surface input through the target construction surface setting device 50, machine body positional information calculated based on the input from the GNSS antennas 40, and information on the posture and position of the front work device 400 calculated based on the input from the angle sensors 36, 37, 38, and 39. The target construction surface's cross-section calculation section 14a uses the above input information to create a cross section of the target construction surface 60 by cutting the target construction surface 60 with a plane parallel to the swing shaft and passing through the center of gravity of the bucket 407 and calculates the distance D from the teeth tips of the bucket 407 to the target construction surface 60 in that cross section.

The vector limiting value calculation section 14c calculates a limiting value V1'y for the component of the velocity vector of the teeth tips of the bucket 407 perpendicular to the target construction surface 60 (hereinafter referred to as the vertical component) based on the distance D and the table of FIG. 15. The limiting value V1'y is 0 when the distance D is 0, and it decreases monotonously with increases in the distance D. When the distance D exceeds a predetermined value d1, the limiting value V1'y is set to −∞. The method of determining the limiting value is not limited to the use of the table of FIG. 15; the limiting value can also be determined from a table in which it decreases monotonously at least within the range in which the distance D increases from 0 up to a positive value.

As illustrated in FIG. 16, in the present embodiment, by adding a velocity vector V2 occurring at the time of boom raising to the velocity vector V1 of the teeth tips of the bucket 407, the velocity vector V1 of the teeth tips of the bucket 407 is corrected to V1' such that the vertical component of the velocity vector V1 of the teeth tips of the bucket 407 is maintained above the limiting value V1' y. The target trajectory corrective boom Pi pressure calculation section 14b calculates a target corrective Pi pressure (target trajectory corrective boom Pi pressure) for the boom cylinder 33a necessary for generating the velocity vector V2 by boom raising. It is also possible to measure boom raising characteristics in advance to obtain the correlation between the target trajectory corrective boom Pi pressure an V2. In the present embodiment, the target trajectory corrective boom Pi pressure is equal to or greater than 0.

For example, in the case of A in FIG. 16, the vector V1 is the uncorrected velocity vector of the bucket teeth tips calculated from information on the posture of the front work device 400 and cylinder speeds. The vertical component of the vector V1 shares the same direction as the limiting value V1'y, and its magnitude exceeds that of the limiting value V1'y. Thus, the vector V1 needs to be corrected by adding the velocity vector V2 occurring at the time of boom raising such that the vertical component of the bucket teeth tips velocity vector becomes equal to V1'y after correction. The direction of the vector V2 is a direction tangent to a circle whose radius is the distance between the pivot center of the boom 405 and the teeth tips 407a of the bucket and can be calculated from the posture of the front work device 400 at that time. The vector having the calculated direction and the magnitude that allows the vertical component of the corrected vector V1' to be V1'y by adding the vector V2 to the uncorrected vector V1 is determined as V2. Because the vector V2 is the only vector that satisfies the above conditions, the target trajectory corrective boom Pi pressure calculation section 14b can calculate a target corrective Pi pressure (target trajectory corrective boom Pi pressure) for the boom cylinder 33a necessary for generating the vector V2.

In the case of B in FIG. 16, since the distance D is 0, the limiting value V1'y is determined as 0 from the table of FIG. 15, and the corrected vector V1' extends along the target construction surface 60. To generate the vector V1', the vector V2 can be added to the teeth tips velocity vector V1 to correct it; thus, the boom raising Pi pressure (target trajectory corrective boom raising Pi pressure) necessary for generating the vector V2 is calculated. The magnitude of V2 can also be calculated using the magnitudes of V1 and V1' and the angle θ between V1 and V1' based on the laws of cosines.

Determining the limiting value for the teeth tips velocity vector as in the table of FIG. 15 prevents intrusion of the teeth tips 407a below the target construction surface 60 because the vertical component of the teeth tips velocity vector gradually gets closer to 0 as the bucket teeth tips 407a get closer to the target construction surface 60.

When the vertical component of the vector V1 faces upward, or when the magnitude of the vector V1 is smaller than that of the limiting value V1'y even if the vertical component of the vector V1 faces downward, no correction is performed, and the target trajectory corrective boom Pi pressure is set to 0.

<2.2.3. Target Corrective Pi Pressure Selection Section 10c>

FIG. 17 illustrates the target corrective Pi pressure selection section 10c in greater detail. The target corrective Pi pressure selection section 10c selects either the target trajectory corrective boom Pi pressure for maintaining the motion trajectory of the front work device 400 above the target construction surface 60 or the target power corrective boom Pi pressure for adjusting the output power of the arm 406 or the bucket 407 to improve the work efficiency of the front work device 400, thereby determining a definitive corrective Pi pressure (target corrective Pi pressure) for the boom.

The target corrective Pi pressure selection section 10c uses the following criteria (I) and (II) to select a Pi pressure.

(I) If the target trajectory corrective boom Pi pressure and the target power corrective boom Pi pressure are both demanding boom raising (i.e., if both are positive), the larger of the two is selected.

(II) If the target trajectory corrective boom Pi pressure is 0 (no demand), the target power corrective boom Pi pressure is selected.

<2.3. Proportional Solenoid Valve Command Voltage Calculation Section 3c>

Referring back to FIG. 3, the proportional solenoid valve command voltage calculation section 3c determines command values for the proportional solenoid valves based on the target corrective Pi pressure calculated by the target corrective Pi pressure calculation section 3b and corrects the operation of the front work device 400 by increasing the Pi pressure of a hydraulic actuator (the boom cylinder 33a). The proportional solenoid valve command voltage calculation section 3c includes a characteristic map indicative of how much voltage is required for the proportional solenoid valves 27 of the hydraulic actuator to achieve the opening degrees that result in the target Pi pressure and calculates command values for the proportional solenoid valves 27 based on the characteristic map.

<3. Operation>

We now describe typical examples of how the above hydraulic excavator operates in forming a target construction surface. For simplification purposes, the target bucket-based power corrective boom Pi pressure calculated by the calculation section 11b is assumed to be 0.

[3.1. When the Distance D from the Teeth Tips 407a to the Target Construction Surface 60 Exceeds d1]

At the beginning of excavation in which the distance D from the bucket teeth tips 407a to the target construction surface 60 exceeds d1 (see FIG. 15), the front work device 400 will not intrude below the target construction surface 60 since the distance between the teeth tips 407a to the target construction surface 60 is large enough. Also, the target trajectory corrective boom Pi pressure calculated by the trajectory corrective Pi pressure calculation section 10b is kept at 0. Thus, only the power corrective Pi pressure calculation section 10a generates a target corrective Pi pressure for the boom 405. As a result, a target power corrective boom Pi pressure is generated from the table 12a of FIG. 12 based on the combination of the difference between the target power and actual power of the arm 406 and the arm bottom pressure (the drive pressure of the arm cylinder 33b at the time of arm crowding).

[3.1.1. When the Difference Between The Target Power and Actual Power of the arm 406 is Equal to or Less than W1]

When the distance D exceeds d1 and the difference between the target power and actual power of the arm 406 is equal to or less than W1, it is determined that the work is being done as expected by the operator. In that case, the target power corrective boom Pi pressure is kept at 0 by the table 12a, and forcible boom raising and lowering are not performed.

[3.1.2. When the Difference Between the Target Power and Actual Power of the Arm 406 Exceeds W1]

However, when the difference between the target power and actual power of the arm 406 exceeds W1, it is determined that the work is not being done as expected by the operator. In that case, the target power corrective boom Pi pressure is calculated based on the arm bottom pressure, and forcible raising and lowering of the boom 405 are performed.

[3.1.2.1. When the Arm Bottom Pressure is Larger Than the Predetermined Value P1]

When the power difference exceeds W1 and the arm bottom pressure is larger than the predetermined value P1, it is determined that too large a load is placed on the arm cylinder 33b such as when the bucket 407 hits hard ground. In that case, a positive value is output as the target power corrective boom Pi pressure, and boom raising is automatically added to the operation of the front work device 400. With the boom raising, the operation of the front work device 400 is automatically shifted to excavating a shallow portion of the ground. As a result, the load on the arm cylinder 33b decreases, and the output power of the hydraulic pump 23 is prevented from being wasted, which in turn reduces fuel consumption.

If the excavation continues to be performed until the distance D falls below d1, the trajectory corrective Pi pressure calculation section 10b becomes capable of generating a target trajectory corrective boom Pi pressure. When the target trajectory corrective boom Pi pressure is generated, the target trajectory corrective boom Pi pressure and the target power corrective boom Pi pressure are both positive. Thus, the target corrective Pi pressure selection section 10c selects the larger of the two. For instance, if the target trajectory corrective boom Pi pressure is selected, the front work device 400 operates such that the bucket teeth tips 407a move along the target construction surface 60 during excavation, thereby forming the target construction surface with accuracy. If, on the other hand, the target power corrective boom Pi pressure is selected, the front work device 400 operates such that the bucket teeth tips 407a move away from the target construction surface 60 during excavation, thereby reducing fuel consumption. In either case, excavation can be performed as close to the target construction surface 60 as possible without the bucket teeth tips 407a intruding below the target construction surface 60. Also, if too large a load is placed on the arm cylinder 33b, boom raising is additionally performed to reduce the load. Thus, fuel is prevented from being wasted.

[3.1.2.2. When the Arm Bottom Pressure is Smaller than the Predetermined Value P1]

If the power difference exceeds W1 and the arm bottom pressure is smaller than the predetermined value P1, it is determined that the load on the arm cylinder 33b is too small such as when the bucket 407 excavates soft ground. In that case, a negative value is output as the target power corrective boom Pi pressure, and boom lowering is automatically added to the operation of the front work device 400. With the boom lowering, the operation of the front work device 400 is automatically shifted to excavating a deep portion of the ground. As a result, the power of the arm cylinder 33b increases, and excavation can be performed fewer times, which in turn reduces fuel consumption.

If the excavation continues to be performed until the distance D falls below d1, the trajectory corrective Pi pressure calculation section 10b becomes capable of generating a target trajectory corrective boom Pi pressure. However, when the target trajectory corrective boom Pi pressure is generated, in which case the target trajectory corrective boom Pi pressure is positive while the target power corrective boom Pi pressure is negative, the target corrective Pi pressure selection section 10c always selects the target trajectory corrective boom Pi pressure. By controlling the boom cylinder 33a based on the target trajectory corrective boom Pi pressure, the front work device 400 can operate such that the bucket teeth tips 407a move along the target construction surface 60 during excavation. As a result, a target construction surface can be formed accurately.

<4. Features and Advantages>

The features and advantages of the above-described embodiment are summarized below.

(1) The hydraulic excavator of the above embodiment includes the multi-joint front work device (work device) 400 for forming a target construction surface 60; the multiple hydraulic actuators 33a, 33b, and 33c for driving the front work device 400 based on Pi pressures (control signals); and the controller 20 having the trajectory corrective Pi pressure calculation section 10b for calculating a trajectory corrective Pi pressure that is a control signal for the boom cylinder 33a (correction target hydraulic actuator) among the multiple hydraulic actuators 33a, 33b, and 33c based on the distance D from the work device 400 to the target construction surface 60 such that the motion trajectory of the front work device 400 is maintained above the target construction surface 60. The controller 20 further includes the power corrective Pi pressure calculation section 10a for calculating a power corrective Pi pressure that is a control signal for the boom cylinder 33a (correction target hydraulic actuator) based on the bottom pressure (drive pressure) of the arm cylinder 33b or the bucket cylinder 33c (particular hydraulic actuator) such that the work efficiency (the amount of soil excavated in a given amount of time) of the arm cylinder 33b or the bucket cylinder 33c increases if the difference between the target power and actual power of the arm cylinder 33b or the bucket cylinder 33c (particular hydraulic actuator) among the multiple hydraulic actuators 33a, 33b, and 33c is larger than a predetermined output power value W1. The boom cylinder 33a (correction target hydraulic actuator) is controlled based on the larger of the power corrective Pi pressure and the trajectory corrective Pi pressure while the arm cylinder 33b or the bucket cylinder 33c (particular hydraulic actuator) is being operated.

By controlling the boom cylinder 33a as described above, excavation can be performed as close to the target construction surface 60 as possible without the front work device 400 intruding below the target construction surface 60. In addition, if too large a load is placed on the arm cylinder 33b or the bucket cylinder 33c, boom raising is additionally performed to reduce the load, preventing fuel from being wasted. Therefore, it is possible to achieve high accuracy of forming a target construction surface and reduced fuel consumption at the same time.

(2) In the hydraulic excavator in (1), the power corrective Pi pressure calculation section 10a calculates the power corrective Pi pressure such that the work device 400 moves away from the target construction surface 60 by the operation of the boom cylinder 33a (correction target hydraulic actuator) if the bottom pressure (drive pressure) of the arm cylinder 33b or the bucket cylinder 33c (particular hydraulic actuator) is larger than a predetermined pressure P1.

With the above, while the arm cylinder 33b or the bucket cylinder 33c is not performing its work due to overload during excavation, the load is reduced automatically. Thus, the output power of the hydraulic pump 23 is not wasted, resulting in reduced fuel consumption.

(3) In the hydraulic excavator in (1) or (2), the power corrective Pi pressure calculation section 10a calculates the power corrective Pi pressure such that the work device 400 moves closer to the target construction surface 60 by the operation of the boom cylinder 33a (correction target hydraulic actuator) if the bottom pressure (drive pressure) of the arm cylinder 33b or the bucket cylinder 33c (particular hydraulic actuator) is smaller than the predetermined pressure P1.

With the above, if the load on the arm cylinder 33b or the bucket cylinder 33c is too small during excavation, the load is increased automatically to such an extent that the front work device 400 does not enter the target construction surface 60. Thus, the number of excavations will not be increased more than necessary, and fuel consumption is reduced.

(4) In the hydraulic excavator in one of (1) to (3), the controller 20 suspends the calculation of the trajectory corrective Pi pressure by the trajectory corrective Pi pressure calculation section 10b and the calculation of the power corrective Pi pressure by the power corrective Pi pressure calculation section 10a if a control signal for the hydraulic swing motor 28 is being output.

This reduces the operator's uncomfortable feeling while he is performing excavation by pressing the bucket against a side wall as in ditching.

<5. Others>

The present invention is not limited to the embodiment described above but allows various modifications without departing from the scope of the invention. For instance, the invention does not necessarily need to have all the components of the embodiment, and some of the components can be removed. Further, some components of an embodiment can be added to another embodiment or replaced by some components of another embodiment.

While we have described a case where actuator control signals are hydraulic control signals (Pi pressures), they can instead be electric signals.

Further, although the target power corrective Pi pressure calculation section 10a includes the calculation sections 11b and 11c as illustrated in FIG. 11, the calculation section 11c can be removed. In that case, the target power corrective boom Pi pressure selection section 11d of FIG. 13 always selects the target arm-based power corrective boom Pi pressure as the target power corrective Pi pressure if no swing operation is performed.

We have stated that if the bottom pressure of the arm cylinder 33b is smaller than the pressure P1, the table 12a of FIG. 12 does not generate a target power corrective boom Pi pressure for boom lowering unless the difference between the target power and actual power of the arm cylinder 33b exceeds the predetermined output power value W1. Alternatively, it is also possible to generate the target power corrective boom Pi pressure for boom lowering if the difference between the target power and actual power of the arm cylinder 33b is equal to or less than the predetermined output power W1. In that case, the target power corrective boom Pi pressure does not need to be increased according to increases in the difference between the target power and actual power of the arm cylinder 33b. For instance, regardless of the difference between the target power and actual power of the arm cylinder 33b, the target power corrective boom Pi pressure can be increased with decreases in arm bottom pressure.

Also, in the above explanation of calculating the limiting value V1'y using the target trajectory corrective Pi pressure calculation section 10b, we have defined the distance D as the distance from the bucket teeth tips 407a to the target construction surface 60. However, the reference point (control point) on the side of the front work device 400 is not limited to the bucket teeth tips 407a but can instead be any point on the front work device 400.

Moreover, while we have described a case where, among the multiple hydraulic actuators 28, 33, 33a, 33b, and 33c installed on the hydraulic excavator, the boom cylinder 33a is operated automatically, other hydraulic actuator can instead be operated automatically.

What is claimed is:

1. A work machine comprising:
a multi-joint work device for forming a target construction surface;
a plurality of hydraulic actuators for driving the work device based on control signals: and
a controller configured to calculate based on a distance from the work device to the target construction surface a trajectory corrective control signal that is a control signal for at least one correction target hydraulic actuator among the plurality of hydraulic actuators such that a motion trajectory of the work device is maintained above the target construction surface, wherein the controller is further configured to calculate, when a difference between a target power and an actual power of at least one particular hydraulic actuator among the plurality of hydraulic actuators is larger than a predetermined output power value, a power corrective control signal that is a control signal for the correction target hydraulic actuator based on a drive pressure of the particular hydraulic actuator, and the correction target hydraulic actuator is controlled based on a larger one of the power corrective control signal and the trajectory corrective control signal while the particular hydraulic actuator is being operated.

2. The work machine of claim 1, wherein, when the drive pressure of the particular hydraulic actuator is larger than a predetermined pressure, the controller calculates the power corrective control signal such that the work device moves away from the target construction surface by an operation of the correction target hydraulic actuator.

3. The work machine of claim 1, wherein, when the drive pressure of the particular hydraulic actuator is smaller than a predetermined pressure, the controller calculates the power corrective control signal such that the work device moves closer to the target construction surface by the operation of the correction target hydraulic actuator.

4. The work machine of claim 1, wherein the work device is a front work device having a boom, an arm, and a bucket, the particular hydraulic actuator includes an arm cylinder for driving the arm, and the correction target hydraulic actuator is a boom cylinder for driving the boom.

5. The work machine of claim 1 further comprising:

a swing structure having the work device attached thereto; and a hydraulic motor for rotating the swing structure based on a control signal, wherein, when a control signal for the hydraulic motor is being output, the controller suspends the calculation of the trajectory corrective control signal and the calculation of the power corrective control signal.

* * * * *